US012563134B2

(12) United States Patent
Park

(10) Patent No.: US 12,563,134 B2
(45) Date of Patent: Feb. 24, 2026

(54) DISPLAY DEVICE, ELECTRONIC DEVICE INCLUDING THE SAME AND METHOD THEREOF

(71) Applicant: Samsung Display Co., Ltd., Yongin-si (KR)

(72) Inventor: Ki-Yong Park, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 467 days.

(21) Appl. No.: 18/158,502

(22) Filed: Jan. 24, 2023

(65) Prior Publication Data

US 2023/0336650 A1      Oct. 19, 2023

(30) Foreign Application Priority Data

Apr. 18, 2022      (KR) ........................ 10-2022-0047665

(51) Int. Cl.
| | |
|---|---|
| *H04M 1/02* | (2006.01) |
| *B32B 7/12* | (2006.01) |
| *B32B 37/12* | (2006.01) |

(52) U.S. Cl.
CPC ............. *H04M 1/0266* (2013.01); *B32B 7/12* (2013.01); *B32B 37/12* (2013.01); *B32B 2307/206* (2013.01); *B32B 2457/20* (2013.01)

(58) Field of Classification Search
CPC ................. H10K 59/131; H10K 59/40; H10K 2102/311; H10K 77/111; H10K 59/873; H10K 59/1201; H10K 59/122; H10K 59/12; H10K 59/8722; H10K 59/1213; H10K 59/1216; H10K 59/124; H10K 59/126; H10K 59/128; H10K 59/65; B32B 2255/26; B32B 23/00; B32B 2307/546; B32B 2457/20; B32B 27/281; B32B 27/283; B32B 27/30; B32B 27/308; B32B 27/34; B32B 27/40; B32B 7/12; B32B 2250/44; B32B 2307/7244; B32B 2307/7246
See application file for complete search history.

(56) References Cited

U.S. PATENT DOCUMENTS

| | | | |
|---|---|---|---|
| 10,862,069 B2 | 12/2020 | Choi et al. | |
| 11,029,788 B2 | 6/2021 | Park et al. | |
| 11,097,521 B2 | 8/2021 | Choi et al. | |
| 11,398,609 B2 * | 7/2022 | Kwon .................. | H10K 77/111 |

(Continued)

FOREIGN PATENT DOCUMENTS

| | | | |
|---|---|---|---|
| KR | 101510202 B1 | 4/2015 | |
| KR | 101801689 B1 | 11/2017 | |

(Continued)

*Primary Examiner* — Golam Sorowar
(74) *Attorney, Agent, or Firm* — CANTOR COLBURN LLP

(57) ABSTRACT

A display device includes a display module including a bending region at which the display module is bent, and a protection cover film removably attached to the display module which is bent. The protection cover film includes an insulating base layer which faces the display module which is bent, an adhesive layer which is between the insulating base layer and the display module and removably attaches the protection cover film to the display module, and the insulating base layer defining an air gap within the insulating base layer, the air gap facing the bending region of the display module which is bent.

10 Claims, 24 Drawing Sheets

(56)        References Cited

U.S. PATENT DOCUMENTS

| | | | | |
|---|---|---|---|---|
| 2013/0300677 | A1* | 11/2013 | Kim | G06F 3/0487 |
| | | | | 345/173 |
| 2016/0155984 | A1* | 6/2016 | Yamazaki | H10K 50/841 |
| | | | | 257/40 |
| 2017/0330925 | A1* | 11/2017 | Tang | H10K 77/111 |
| 2019/0051858 | A1* | 2/2019 | Tomioka | G02F 1/1339 |
| 2021/0151541 | A1 | 5/2021 | Lim et al. | |
| 2021/0327312 | A1* | 10/2021 | Choi | G06F 1/1652 |

FOREIGN PATENT DOCUMENTS

| | | | |
|---|---|---|---|
| KR | 101801690 | B1 | 11/2017 |
| KR | 1020200013194 | A | 2/2020 |
| KR | 1020210015096 | A | 2/2021 |
| KR | 1020210060733 | A | 5/2021 |
| KR | 1020210101428 | A | 8/2021 |

* cited by examiner

WBM

WM
AF2
OTF
AF1
ISP
DP
LM

I                                                                    I'

DR3
DR2    DR1

DISPLAY DEVICE, ELECTRONIC DEVICE INCLUDING THE SAME AND METHOD THEREOF

This U.S. non-provisional patent application claims priority to Korean Patent Application No. 10-2022-0047665, filed on Apr. 18, 2022, and all the benefits accruing therefrom under 35 U.S.C. § 119, the entire contents of which are hereby incorporated by reference.

BACKGROUND

(1) Field

The present disclosure herein relates to a display device and a method of manufacturing (or providing) an electronic device using the same. More particularly, the present disclosure relates to a display device having improved protection performance and a method of manufacturing (or providing) an electronic device using the same.

(2) Description of the Related Art

Electronic devices such as a smartphone, a tablet, a laptop computer, and a smart television are being developed. These electronic devices include a display device for providing information visually, audibly, etc. The electronic devices further include various electronic modules in addition to the display device.

The display device and the electronic modules are assembled together to manufacture various electronic devices. In this case, the electronic modules are organically arranged using an outer case and a bracket of the electronic devices.

SUMMARY

The present disclosure provides a display device capable of protecting a display module during product assembly, and a method of manufacturing (or providing) an electronic device using the display device.

An embodiment of the invention provides a display device including a display module including a bending region at which the display module is bent, and a protection cover film disposed below the bending region of the display module to protect the display module.

The protection cover film includes an insulating base layer which faces the display module which is bent, and an adhesive layer which is disposed between the insulating base layer and the display module. The insulating base layer define an air gap within the insulating base layer, the air gap faces the bending region of the display module which is bent.

In an embodiment of the invention, a display device includes a display module including a bending region at which the display module is bent, and a protection cover film disposed below the bending region of the display module to protect the display module.

The protection cover film includes an insulating base layer which faces the display module which is bent, and an adhesive layer which is disposed between the insulating base layer and the display module. The insulating base layer defines a shape processing portion (e.g., a patterned portion) facing the bending region of the display module which is bent.

In an embodiment of the invention, a method of providing an electronic device includes preparing a display device including a display module including a bending region at which the display module is bent, and a protection cover film disposed below the bending region of the display module to protect the display module, removing the protection cover film from the display device, and attaching the display module to components of an electronic device.

The protection cover film includes an insulating base layer which faces the display module which is bent, and an adhesive layer which is disposed between the insulating base layer and the display module. The insulating base layer defines an impact-absorbing member of the display module which is bent.

BRIEF DESCRIPTION OF THE FIGURES

The accompanying drawings are included to provide a further understanding of the invention, and are incorporated in and constitute a part of this specification. The drawings illustrate embodiments of the invention and, together with the description, serve to explain the invention. In the drawings.

DETAILED DESCRIPTION

Figure 1A:
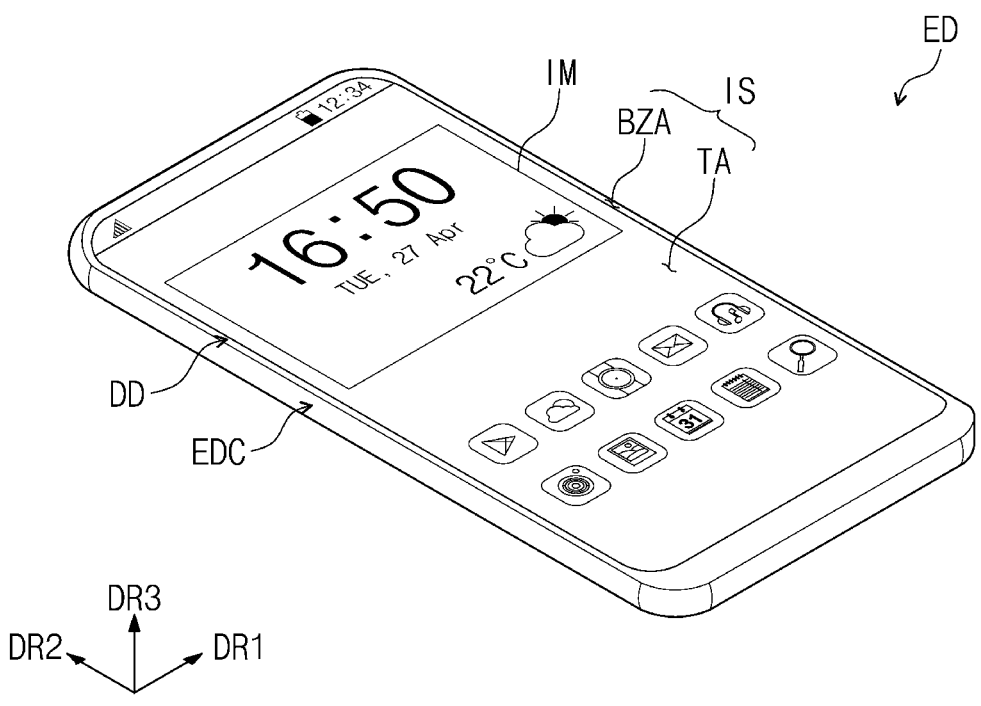
FIG. 1A is a perspective view of an electronic device according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In this specification, when an element (or a region, a layer, a portion, or the like) is referred to as related to another element such as "being on", "being connected to", or "being coupled to" another element, it may be directly disposed/connected/coupled to another element, or an intervening third element may also be disposed therebetween. In contrast, when an element (or a region, a layer, a portion, or the like) is referred to as related to another element such as "being directly on", "being directly connected to", or "being directly coupled to" another element, no intervening third element is disposed therebetween.

Like numbers refer to like elements throughout. As used herein, a reference number may indicate a singular element or a plurality of the element. For example, a reference number labeling a singular form of an element within the drawing figures may be used to reference a plurality of the singular element within the text of specification.

In addition, in the drawings, the thickness, the ratio, and the dimensions of elements are exaggerated for an effective description of technical contents. The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." The term "and/or," includes all combinations of one or more of which associated configurations may define.

It will be understood that, although the terms first, second, etc. may be used herein to describe various elements, these elements should not be limited by these terms. These terms are only used to distinguish one element from another element. For example, a first element may be referred to as a second element, and similarly, a second element may be referred to as a first element without departing from the teachings of the present disclosure. The singular forms are intended to include the plural forms as well, unless the context clearly indicates otherwise.

In addition, terms such as "below," "lower," "on," "upper," and the like are used to describe the relationship of the configurations shown in the drawings. The terms are used as a relative concept and are described with reference to the direction indicated in the drawings.

It should be understood that the terms "comprise", or "have" are intended to specify the presence of stated features, integers, steps, operations, elements, components, or combinations thereof in the disclosure, but do not preclude the presence or addition of one or more other features, integers, steps, operations, elements, components, or combinations thereof.

Unless otherwise defined, all terms (including technical and scientific terms) used herein have the same meaning as commonly understood by one of ordinary skill in the art to which the present disclosure belongs. Also, terms, such as those defined in commonly used dictionaries, should be interpreted as having a meaning that is consistent with their meaning in the context of the relevant art and should not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described with reference to the accompanying drawings.

Figure 1B:
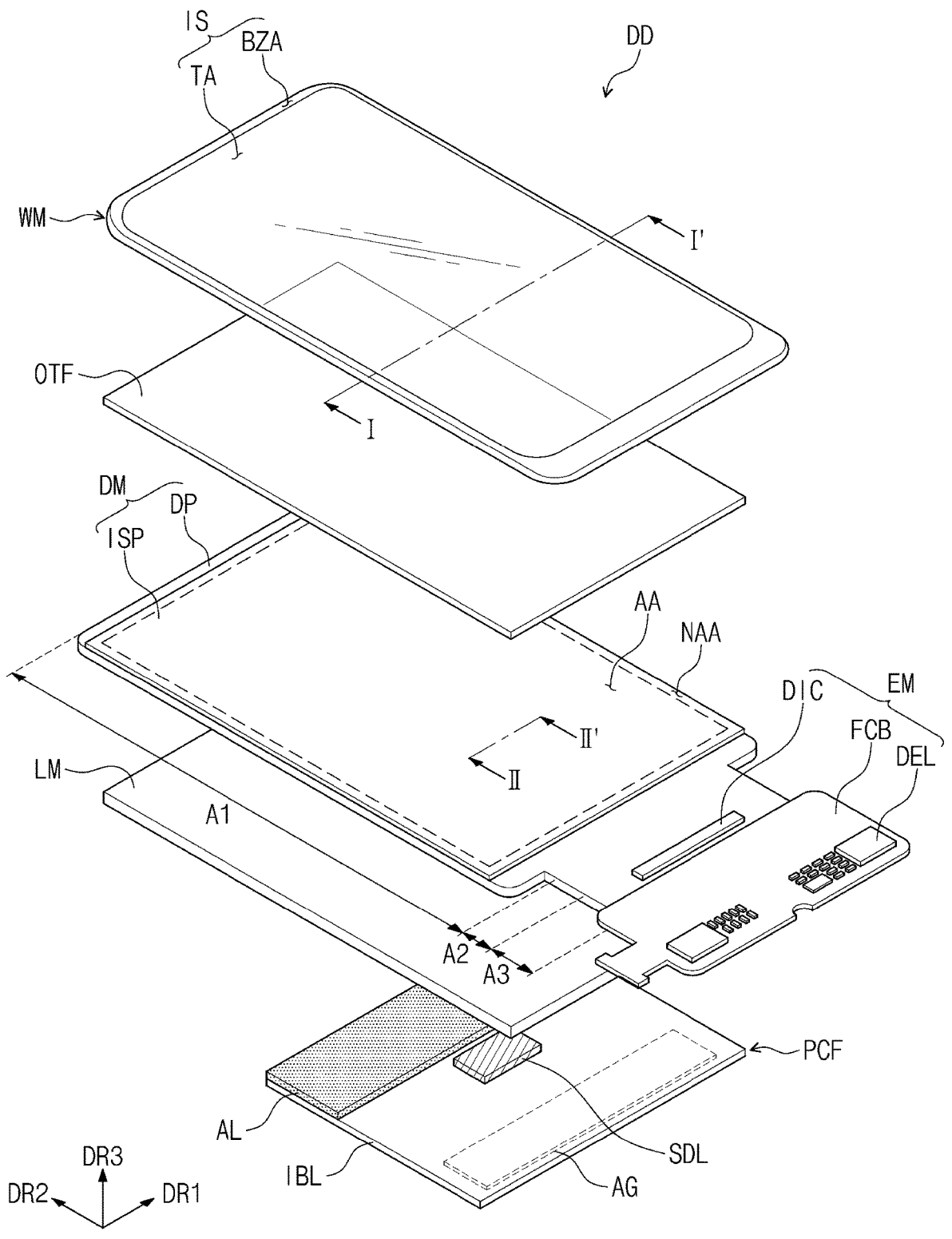
FIG. 1B is an exploded perspective view of a display device according to an embodiment of the invention.
Figure 1C:
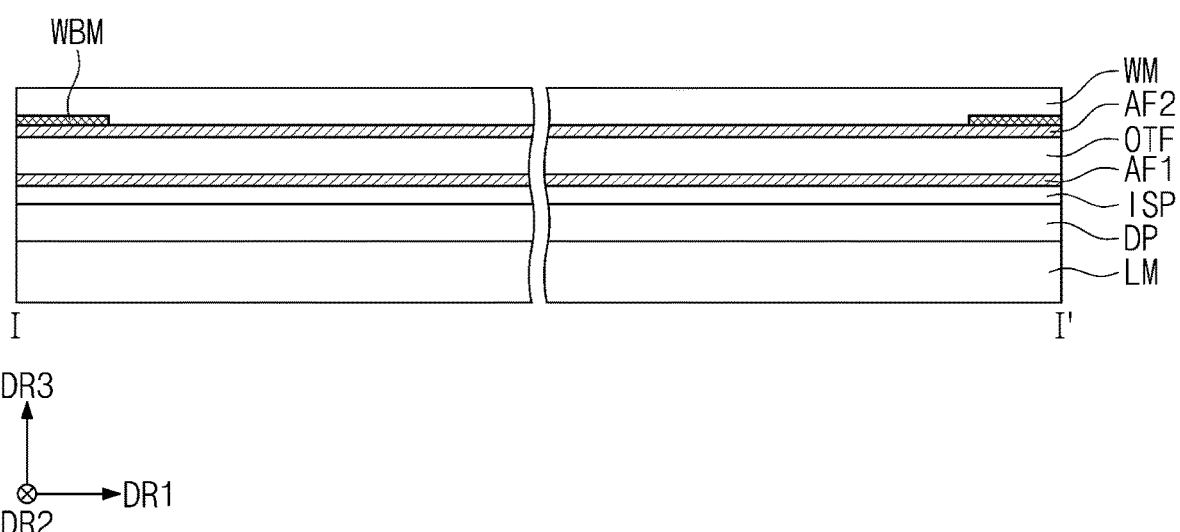
FIG. 1C is a cross-sectional view a display device, taken along line shown in FIG. 1B.

FIG. 1A is a perspective view of an electronic device ED according to an embodiment of the invention, and FIG. 1B is an exploded perspective view of a display device DD according to an embodiment of the invention. FIG. 1C is a cross-sectional view a display device DD, taken along line shown in FIG. 1B.

Referring to FIGS. 1A to 1C, the electronic device ED may be a device activated, driven or operated according to electrical signals. The electronic device ED may include various embodiments. For example, the electronic device ED may be a smart watch, a tablet, a laptop, a computer, or a smart television, without being limited thereto.

The electronic device ED may display an image IM towards (or in) a third direction DR3, on a display surface IS parallel to a plane defined by a first direction DR1 and a second direction DR2 crossing each other. The display surface IS on which the image IM is displayed may correspond to a front surface of the electronic device ED. The image IM may include still images as well as dynamic images.

In the present embodiment, a front surface (or an upper surface) and a rear surface (or a lower surface) of the electronic device ED and respective members thereof, are defined with respect to the third direction DR3 in which the image IM is displayed (e.g., an image-display direction or a light-emission direction). Front and rear surfaces may oppose each other in (or along) the third direction DR3, and a normal direction relative to each of the front and rear surfaces may be parallel to the third direction DR3.

The distance between the front surface and the rear surface in the third direction DR3 may correspond to a thickness in the third direction DR3 of the electronic device ED (e.g., a thickness direction). Directions indicated by the first to third directions DR1, DR2, and DR3 are relative concepts, and may thus be changed to other directions.

The electronic device ED may detect an external input applied from the outside, such as from outside the electronic device ED. The external input may include various forms of inputs provided from outside the electronic device ED. For example, the external inputs may be applied when approaching the electronic device ED or being adjacent by a predetermined distance (e.g., hovering), as well as being applied by contact with the electronic device ED. The external input may be applied by an input tool, such as by a body part such as a user's hand. In addition, the external input may have various forms such as force, pressure, temperature, light, etc.

The front surface of the electronic device ED may be divided into a transmission region TA and a bezel region BZA. The transmission region TA may be a region in which the image IM is displayed (e.g., a display area or a display region). The image IM may be viewable from outside the electronic device ED, such as by a user, through the transmission region TA. In the present embodiment, the transmission region TA is shown to have a planar shape which is a rectangular shape having rounded corners. However, this is presented as an example, and the transmission region TA may have various planar shapes and is not limited to any one embodiment.

The bezel region BZA is adjacent to the transmission region TA. The bezel region BZA may have a predetermined color. The bezel region BZA may be a region in which the image IM is not displayed (e.g., a non-display area or a non-display region). The bezel region BZA may surround the transmission region TA, in a plan view (e.g., view along the third direction DR3 or along the thickness direction). Accordingly, the planar shape of the transmission region TA may be substantially defined by the bezel region BZA. However, this is merely shown as an example, and the bezel region BZA may be disposed adjacent to only one side of the transmission region TA or entirely omitted. The electronic device ED according to an embodiment of the invention may include various embodiments and is not limited to any one embodiment.

The electronic device ED may include a display device DD and an outer case EDC. The display device DD may include a window WM, a display module DM, a driving module EM, an optical film OTF, a lower module LM, and a protection cover film PCF.

The window WM may be formed of (or include) a transparent material capable of emitting images. For example, the window WM may be formed of glass, sapphire, plastic, etc. The window WM is shown as a single layer, but is not limited thereto and may include a plurality of layers, such as along the thickness direction. Although not shown, the bezel region BZA of the display device DD described above may be provided as a region or planar area in which a material including a predetermined color is provided, such as by printing, on one region of the window WM. As an example of the invention, the window WM may include a bezel pattern WBM for defining the bezel region BZA. The bezel pattern WBM is a colored organic film and may be formed (or provided), for example, through a coating method.

The display module DM may include a display panel DP, and an input sensing layer ISP which faces the display panel DP, along the thickness direction. The display panel DP according to an embodiment of the invention may be a light emitting display panel, and is not particularly limited. For example, the display panel DP may be an organic light emitting display panel, an inorganic light emitting display panel, or a quantum dot light emitting display panel. An emission layer of the organic light emitting display panel may include an organic light emitting material, and an emission layer of the inorganic light emitting display panel may include an inorganic light emitting material. An emission layer of the quantum dot light emitting display panel may include quantum dots, quantum rods, etc. Hereinafter, the display panel DP will be described as an organic light emitting display panel.

The input sensing layer ISP may be directly disposed on the display panel DP. As being directly on, elements may form an interface therebetween. According to an embodiment of the invention, the input sensing layer ISP may be formed on the display panel DP, through a roll-to-roll process. That is, when the input sensing layer ISP is directly disposed on the display panel DP, an intermediate member such as an adhesive member is not disposed between the input sensing layer ISP and the display panel DP.

The display panel DP generates the image IM, and the input sensing layer ISP acquires coordinate information of external inputs (e.g., a touch event as an external input).

The optical film OTF reduces reflectance of external light incident from an upper side of the window WM, that is, from outside the electronic device ED. The optical film OTF according to an embodiment of the invention may include a phase retarder and/or a polarizer. The phase retarder may be a film type or a liquid crystal coating type, and may include a $\lambda/2$ phase retarder and/or a $\lambda/4$ phase retarder. The polarizer may also be a film type or a liquid crystal coating type. The film type may include an elongated synthetic resin film, and the liquid crystal coating type may include liquid crystals arranged in a predetermined arrangement. The retarder and the polarizer may be implemented as one polarizing film. The optical film OTF may further include a protection film disposed above or below the polarizing film.

The optical film OTF may be disposed on the input sensing layer ISP, such as to face the input sensing layer ISP, along the thickness direction. That is, the optical film OTF may be disposed between the input sensing layer ISP and the window WM. The input sensing layer ISP, the optical film OTF, and the window WM may be bonded to one another through respective adhesive members. As adhesive members, a first adhesive film AF1 is disposed between the input sensing layer ISP and the optical film OTF, and a second adhesive film AF2 is disposed between the optical film OTF and the window WM. Accordingly, the optical film OTF is coupled to the input sensing layer ISP through the first adhesive film AF1, and the window WM is coupled to the optical film OTF through the second adhesive film AF2.

As an example of the invention, each of the first and second adhesive films AF1 and AF2 may include an optically clear adhesive material or film (OCA film). However, a material of each of the first and second adhesive films AF1 and AF2 is not limited thereto, and may include a typical adhesive or a gluing agent. For example, each of the first and second adhesive layers AF1 and AF2 may include a pressure sensitive adhesive (PSA), an optically clear adhesive (OCA), or an optical clear resin (OCR).

In addition to the optical film OTF, a functional layer that serves another function, for example, a protection layer, may be further disposed between the display module DM and the window WM.

The display module DM may display images according to electrical signals and transmit/receive information on external inputs. The display module DM may be defined as including an active region AA and a peripheral region NAA. The active region AA may be defined as a region for outputting images provided from the display module DM.

The peripheral region NAA is adjacent to the active region AA. For example, the peripheral region NAA may surround the active region AA. However, this is shown as an example, and the peripheral region NAA may be defined in various shapes, and is not limited to any one embodiment. According to an embodiment, the active region AA of the display module DM may correspond to at least a portion of the transmission region TA.

According to an embodiment of the invention, the display module DM may include a first region A1, a second region A2, and a third region A3, which are arranged in order, along the second direction DR2. The first region A1 may be a region corresponding to the display surface IS. The second region A2 and the third region A3 may both be included in the peripheral region NAA. Various components or layers of the electronic device ED may include a first region A1, a second region A2, and/or a third region A3 corresponding to those described above.

The second region A2 may be a bending region at which the display device DD, the display module DM and/or the electronic device ED is bendable with respect to a bending axis RX. The first and third regions A1 and A3 may be non-bending regions. The first and third regions A1 and A3 may remain flat or unbent, even when the display device DD, the display module DM and/or the electronic device ED is bent about the bending axis RX. The bending axis RX may extend along the first direction DR1, without being limited thereto. Various components, elements, and/or layers of the electronic device ED, may be bendable together with each other, without being limited thereto.

Each of the regions may have a length along the first direction DR1. A length of the second region A2 and a length of the third region A3, may each be smaller than a length of the first region A1, with respect to the first direction DR1. A region which is short in length in the direction of the bending axis RX (e.g., the first direction DR1), may be bent more easily.

The driving module EM may control driving of the display module DM. The driving module EM may include a flexible circuit film FCB and a driving chip DIC. The flexible circuit film FCB may be electrically connected to the display panel DP, at the third region A3. The flexible circuit film FCB may be bonded to an end of the third region A3 of the display module DM, such as through a bonding process. The flexible circuit film FCB may be electrically connected to the display module DM through an anisotropic conductive adhesive layer. The driving chip DIC may be mounted on the third region A3 of the display module DM. The driving chip DIC may be a part of the display module DM, without being limited thereto. The driving chip DIC may include driving circuits, for example, a data driving circuit, for driving pixels PX of the display panel DP.

The driving module EM may further include a driving element DEL provided in plural including a plurality of driving elements DEL mounted on the flexible circuit film FCB. The plurality of driving elements DEL may include a circuit unit for converting signals input from the outside into signals required for the driving chip DIC or into signals required for driving the display module DM. The electronic device ED, the display device DD, the display module DM and/or the display panel DP which is bent, may dispose the flexible circuit film FCB below the display module DM.

The lower module LM is disposed under the display module DM. The lower module LM may be disposed on a rear surface of the display module DM to improve impact resistance of the display device DD. The lower module LM may be fixed to the rear surface of the display module DM through an adhesive member. The lower module LM fixed to the display module DM may be considered a part of the display module DM. The adhesive film may be a pressure sensitive adhesive (PSA), an optically clear adhesive (OCA), or an optical clear resin (OCR). The electronic device ED, the display device DD, the display module DM and/or the display panel DP which is bent, may dispose the third region A3 of the display module DM and the flexible circuit film FCB on the rear surface of the lower module LM.

The protection cover film PCF is disposed below the display module DM and the lower module LM. To be specific, the protection cover film PCF may be disposed below the rear surface of the lower module LM and below the third region A3 of the display module DM, to protect a bending region of the display module DM and the flexible circuit film FCB. The protection cover film PCF may have a rectangular shape and may have a tape form. However, the shape and the form of the protection cover film PCF is not limited thereto. The protection cover film PCF may have various shapes within ranges having a size enough to sufficiently cover the flexible circuit film FCB. The size of the protection cover film PCF may be a planar size.

The protection cover film PCF includes an insulating base layer IBL, an adhesive layer AL, and a step difference layer SDL. The insulating base layer IBL may include an insulating material. The insulating material may be a synthetic resin film, and may include at least one of polyethylene terephthalate (PET), polyimide (PI), polyamide (PAI), polyethylene naphthalate (PEN), and polycarbonate (PC). The insulating base layer IBL may include a transparent insulating material.

The adhesive layer AL is partially disposed on the insulating base layer IBL. The adhesive layer AL may be disposed between the insulating base layer IBL and the lower module LM, to fix the insulating base layer IBL to the lower module LM.

The step difference layer SDL is disposed on the insulating base layer IBL. As an example of the invention, the step difference layer SDL may have adhesive properties.

The step difference layer SDL may be disposed to be spaced apart from the adhesive layer AL, in a direction along the protection cover film PCF. However, the embodiment of the invention is not limited thereto. The step difference layer SDL and the adhesive layer AL may be in the form of a single body. The protection cover film PCF will be described later with reference to FIGS. 4A to 7B.

The outer case EDC accommodates the display device DD within an inner space or inner area of the outer case EDC. The outer case EDC may be bonded to the window WM to define an exterior of the electronic device ED. The outer case EDC absorbs shocks applied from the outside and prevents foreign substances/moisture from penetrating into the electronic device ED to protect components received in the outer case EDC. As an example of the invention, the outer case EDC may be provided in a form in which a plurality of storage members are combined.

Figure 2A:
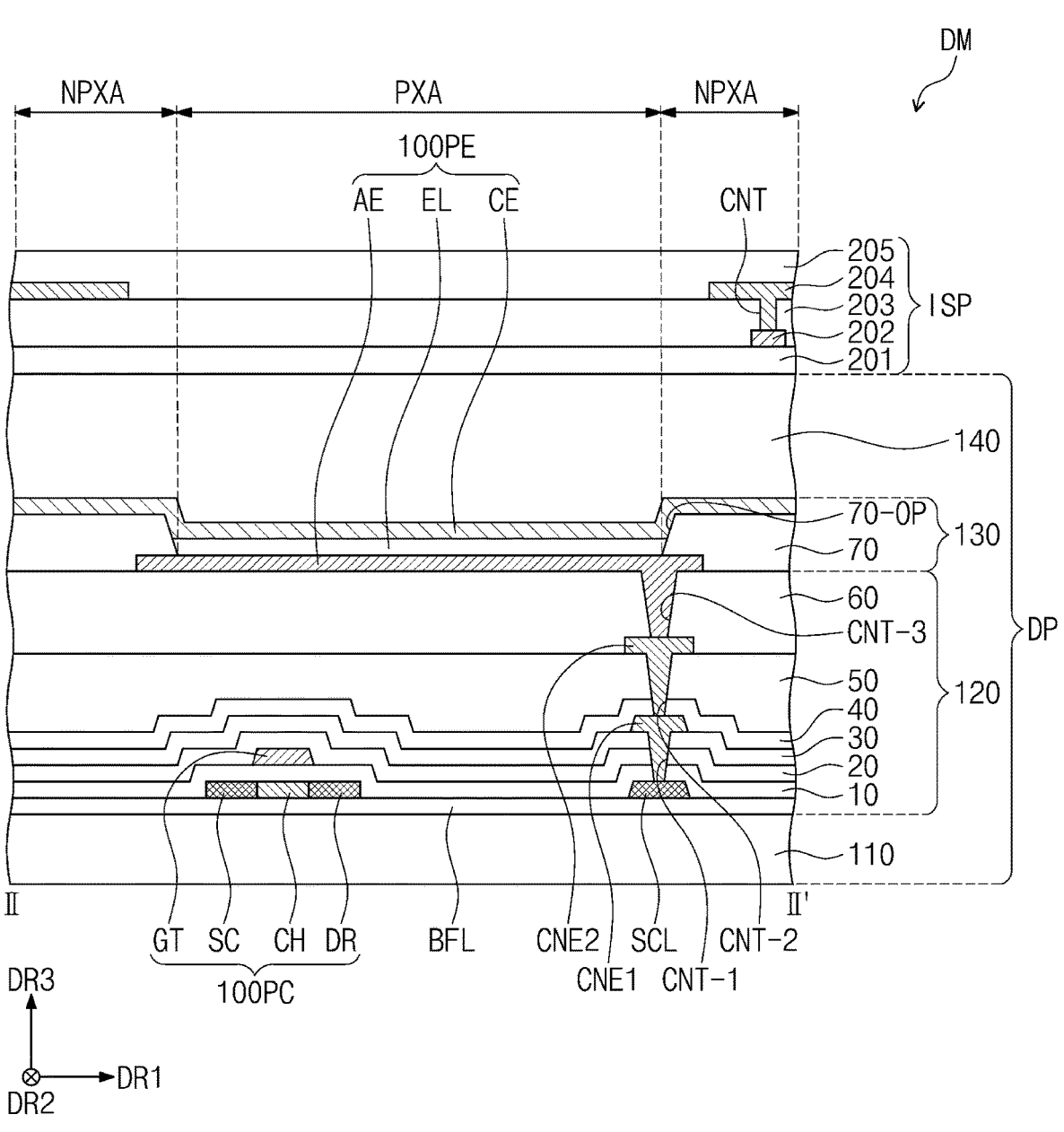
FIG. 2A is an enlarged cross-sectional view of a display module, taken along line II-IP shown in FIG. 1B.
Figure 2B:
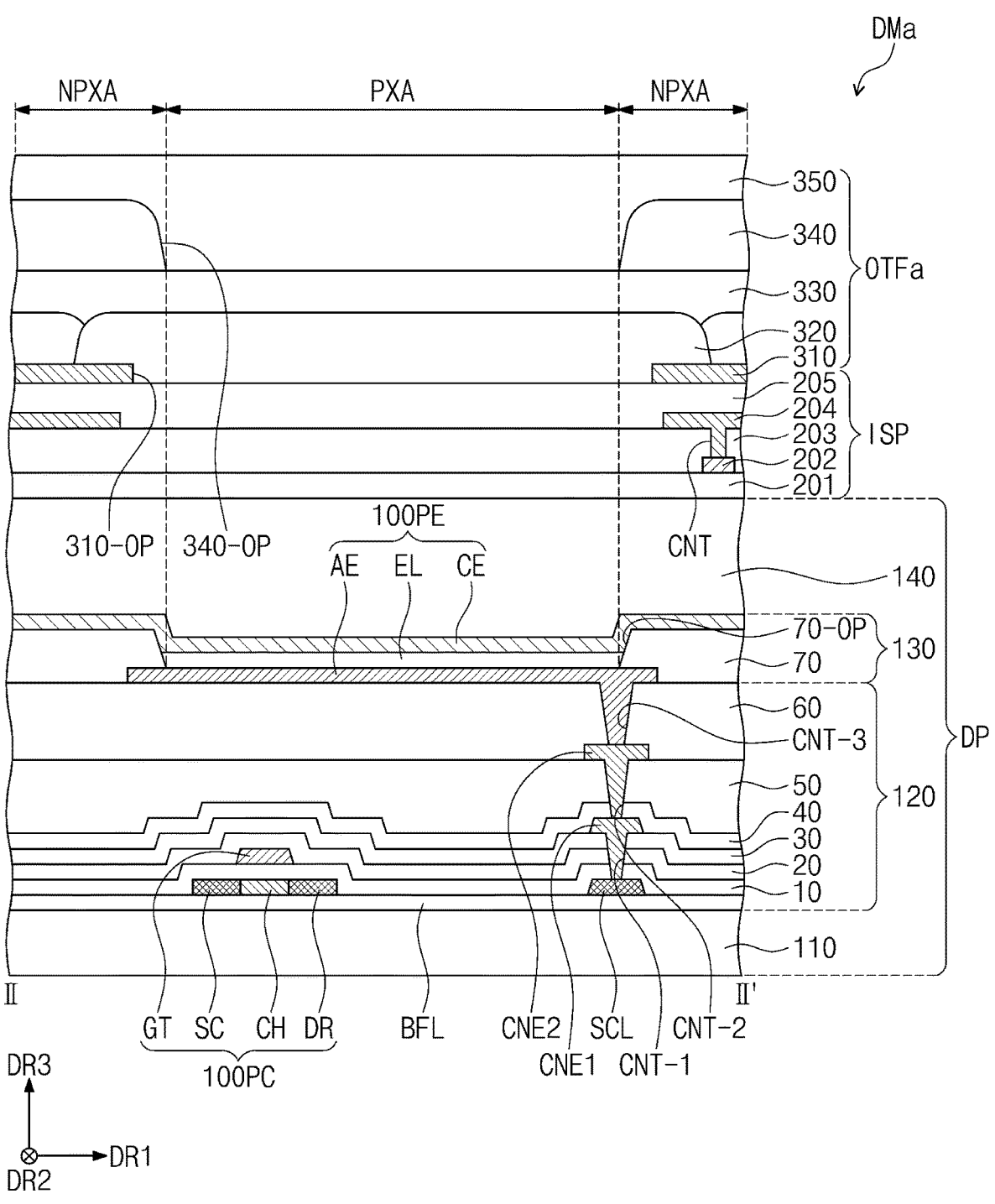
FIG. 2B is an enlarged cross-sectional view of a display module according to an embodiment of the invention.

FIG. 2A is a cross-sectional view of a display module DM taken along line II-II' shown in FIG. 1B, and FIG. 2B is a cross-sectional view of a display module DMa according to an embodiment of the invention.

Referring to FIG. 2A, the display panel DP may include a panel base layer 110, a circuit element layer 120, a light emitting element layer 130, and an encapsulation layer 140. The panel base layer 110 may be a member providing a base surface on which the circuit element layer 120 is disposed. The panel base layer 110 may be a glass substrate, a metal substrate, or a polymer substrate. However, the embodiment of the invention is not limited thereto, and the panel base layer 110 may be an inorganic layer, an organic layer, or a composite material layer.

The panel base layer 110 may have a multilayer structure. For example, the panel base layer 110 may include a first synthetic resin layer, a silicon oxide (SiOx) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may be referred to as a base barrier layer.

The first and second synthetic resin layers each may include a polyimide-based resin. In addition, the first and second synthetic resin layers each may include at least one of an acrylic-based resin, a methacrylate-based resin, a polyisoprene-based resin, a vinyl-based resin, an epoxy-based resin, a urethane-based resin, a cellulose-based resin, a siloxane-based resin, a polyamide-based resin, and a perylene-based resin. In the present description, a " $\sim\sim$ "-based resin indicates that a functional group of " $\sim\sim$ " is included.

The circuit element layer 120 may be disposed on the panel base layer 110. The circuit element layer 120 may include an insulating layer, a semiconductor pattern, a conductive pattern, and a signal line. The insulating layer, the semiconductor layer, and the conductive layer are formed on the panel base layer 110 through methods such as coating or vapor deposition, and then the insulating layer, the semiconductor layer, and the conductive layer may be selectively patterned through multiple times of a photolithography process. Thereafter, a semiconductor pattern, a conductive pattern, and a signal line included in the circuit element layer 120 may be formed.

At least one inorganic layer may be formed (or provided) on an upper surface of the panel base layer 110, to be between the panel base layer 110 and the circuit element layer 120. The inorganic layer may include at least one among aluminum oxide, titanium oxide, silicon oxide, silicon nitride, silicon oxynitride, zirconium oxide, and hafnium oxide. The inorganic layer may be formed as multiple layers. The multi-layered inorganic layers may constitute a barrier layer and/or a buffer layer. In the present embodiment, the display panel DP is shown to include a buffer layer BFL.

The buffer layer BFL may increase bonding force between the panel base layer 110 and the semiconductor pattern. The buffer layer BFL may include at least one of silicon oxide, silicon nitride, and silicon oxynitride. For example, the buffer layer BFL may include a structure in which a silicon oxide layer and a silicon nitride layer are alternately stacked.

The semiconductor pattern may be disposed on the buffer layer BFL. The semiconductor pattern may include polysilicon. However, the embodiment of the invention is not limited thereto, and the semiconductor patterns may include amorphous silicon, low-temperature polycrystalline silicon, or an oxide semiconductor.

FIG. 2A shows only some semiconductor patterns, and semiconductor patterns may be further disposed in other regions of the display panel DP. The semiconductor pattern may be arranged by specific rules over pixels PX of the display panel DP. The semiconductor pattern may have different electrical properties according to a level of doping at various areas, such as region with/without doping. The semiconductor pattern may include a high conductivity region having high conductivity, and a low conductivity region having low conductivity. The high conductivity region may be doped with an N-type dopant or a P-type dopant. A P-type transistor may include a doped region doped with the P-type dopant, and a N-type transistor may include a doped region doped with the N-type dopant. The low conductivity region may be a non-doped region or may be doped in a lower concentration than the high conductivity region.

The high conductivity region may have greater conductivity (e.g., electrical conductivity) than the low conductivity region, and may substantially serve as an electrode or a signal line. The low conductivity region may substantially correspond to a channel region of a transistor. That is, a portion of the semiconductor pattern may be a channel region of the transistor, another portion may be a source or drain region of the transistor, and the other portion may be a connection electrode or a connection signal line.

The pixels PX each may have an equivalent circuit including a plurality of transistors, at least one capacitor, and a light emitting element, and the equivalent circuit diagram of the pixels PX may be modified in various forms. In FIG. 2A, one transistor 100PC included in each of pixels PX, and a light emitting element 100PE which is connected to the one transistor 100PC, are shown as an example. That is, the circuit element layer 120 is connected to the light emitting element layer 130.

A source region SC, a channel region CH, and a drain region DR of the transistor 100PC may be formed from (or by) regions of the semiconductor pattern. The source region SC and the drain region DR may extend in opposite directions from the channel region CH, on a cross section. FIG. 2A shows a portion of a connection signal line SCL formed from the semiconductor pattern. Although not shown separately, the connection signal line SCL may be connected to the drain region DR of the transistor 100PC, on a plane.

A first insulating layer 10 may be disposed on the buffer layer BFL. The first insulating layer 10 may commonly overlap a plurality of pixels PX and cover the semiconductor pattern. The first insulating layer 10 may be an inorganic layer and/or an organic layer, and have a single-layered or multi-layered structure. The first insulating layer may include at least one among aluminum oxide, titanium oxide, silicon oxide, silicon nitride, silicon oxynitride, zirconium oxide, and hafnium oxide. In the present embodiment, the first insulating layer 10 may be a single-layered silicon oxide layer. An insulating layer of the circuit element layer 120, which will be described later, as well as the first insulating layer may be an inorganic layer and/or an organic layer, and may have a single or multi-layered structure. The inorganic layer may include at least one of the materials described above, but is not limited thereto.

A gate GT of the transistor 100PC is disposed on the first insulating layer 10. The gate GT may be a respective portion of a metal pattern. The gate GT overlaps the channel region CH. In the process of doping the semiconductor pattern, the gate GT may function as a mask.

A second insulating layer 20 may be disposed on the first insulating layer 10 and may cover the gate GT. The second insulating layer 20 may commonly overlap pixels PX. The second insulating layer 20 may be an inorganic layer and/or an organic layer, and may have a single-layered or multi-layered structure. The second insulating layer 20 may include at least one of silicon oxide, silicon nitride, and silicon oxynitride. In the present embodiment, the second insulating layer 20 may have a multi-layered structure including a silicon oxide layer and a silicon nitride layer.

A third insulating layer 30 may be disposed on the second insulating layer 20. The third insulating layer 30 may have a single-layered or multi-layered structure. For example, the third insulating layer 30 may have a multi-layered structure including a silicon oxide layer and a silicon nitride layer.

A first connection electrode CNE1 may be disposed on the third insulating layer 30. The first connection electrode CNE1 may be connected to the connection signal line SCL through (or at) a contact hole CNT-1 passing through each of the first, second, and third insulating layers 10, 20, and 30.

A fourth insulating layer 40 may be disposed on the third insulating layer 30. The fourth insulating layer 40 may be a single-layered silicon oxide. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 through a contact hole CNT-2 passing through each of the fourth insulating layer 40 and the fifth insulating layer 50.

A sixth insulating layer 60 may be disposed on the fifth insulating layer 50 and may cover the second connection electrode CNE2. The sixth insulating layer 60 may be an organic layer.

The light emitting element layer 130 may be disposed on the circuit element layer 120. The light emitting element layer 130 may include a light emitting element 100PE. For example, the light emitting element layer 130 may include organic light emitting materials, quantum dots, quantum rods, micro light emitting diodes (LEDs), or nano LEDs. Hereinafter, the light emitting element 100PE is described as an organic light emitting element as an example, but is not particularly limited thereto.

The light emitting element 100PE may include a first electrode AE, an emission layer EL, and a second electrode CE. The first electrode AE may be disposed on the sixth insulating layer 60. The first electrode AE may be connected to the second connection electrode CNE2 through a contact hole CNT-3 passing through the sixth insulating layer 60.

A pixel defining film 70 may be disposed on the sixth insulating layer 60 and may cover a portion of the first electrode AE. An opening 70-OP is defined in (or by portions of) the pixel defining film 70. The opening 70-OP of the pixel defining film 70 exposes at least a portion of the first electrode AE, to outside the pixel defining film 70.

The active region AA (see FIG. 1B) may include a light emitting region PXA and a non-light emitting region NPXA which is adjacent to the light emitting region PXA. The non-light emitting region NPXA may surround the light emitting region PXA, in the plan view. In the present embodiment, the light emitting region PXA is defined to correspond to a portion of the first electrode AE which is exposed to outside the pixel defining film 70, through the opening 70-OP.

The emission layer EL may be disposed on the first electrode AE. The emission layer EL may be disposed in a region corresponding to the opening 70-OP. That is, the emission layer EL may be separately formed on each of the pixels PX, such as to define a plurality of emission layers EL spaced apart from each other along the light emitting element layer 130. When the emission layer EL is separately formed on each of the pixels PX, the emission layers EL each may emit light of at least one color among blue, red, and green. However, the embodiment of the invention is not limited thereto, and the emission layer EL may be connected to the pixels PX to be commonly provided. In this case, the emission layer EL may provide blue light or white light.

The second electrode CE may be disposed on the emission layer EL. The second electrode CE may have a single-body shape and may be commonly disposed in a plurality of pixels PX.

Although not shown, a hole control layer may be disposed between the first electrode AE and the emission layer EL. The hole control layer may be commonly disposed in the light emitting region PXA and the non-light emitting region NPXA. The hole control layer may include a hole transport layer, and may further include a hole injection layer. An electron control layer may be disposed between the emission layer EL and the second electrode CE. The electron control layer may include an electron transport layer, and may further include an electron injection layer. The hole control layer and the electron control layer may be commonly formed in a plurality of pixels PX, using an open mask.

The encapsulation layer 140 may be disposed on the light emitting element layer 130. The encapsulation layer 140 may include an inorganic layer, an organic layer, and an inorganic layer which are sequentially stacked along the thickness direction, but the layers forming the encapsulation layer 140 are not limited thereto.

The inorganic layers may protect the light emitting element layer 130 from moisture and oxygen, and the organic layer may protect the light emitting element layer 130 from foreign substances such as dust particles. The inorganic layers may include a silicon nitride layer, a silicon oxy nitride layer, a silicon oxide layer, a titanium oxide layer, or an aluminum oxide layer. The organic layer may include an acrylic-based organic layer, but is not limited thereto.

For example, the input sensing layer ISP may be formed on the display panel DP through a roll-to-roll process. In this case, the input sensing layer ISP may be expressed as being 'directly disposed' on the display panel DP. Being directly disposed may indicate that a third component is not disposed between the input sensing layer ISP and the display panel DP. That is, a separate adhesive member may not be disposed between the input sensing layer ISP and the display panel DP. Alternatively, the input sensing layer ISP may be provided as a separate module and may be bonded to the display panel DP through an adhesive member. The adhesive layer may include a typical adhesive or a gluing agent.

The input sensing layer ISP may include a first sensing insulating layer 201, a first conductive layer 202, a second sensing insulating layer 203, a second conductive layer 204, and a cover insulating layer 205.

The first sensing insulating layer 201 may be an inorganic layer including at least any one of silicon nitride, silicon oxynitride, and silicon oxide. Alternatively, the first sensing insulating layer 201 may be an organic layer including an epoxy resin, an acrylic resin, or an imide-based resin. The first sensing insulating layer 201 may have a single layer structure or may have a multilayer structure stacked along the third direction DR3.

The first conductive layer 202 and the second conductive layer 204 each may have a single layer structure or may have a multilayer structure stacked along the third direction DR3. In the present embodiment, a single-layered metal layer may include molybdenum, silver, titanium, copper, aluminum, or an alloy thereof. The conductive layer having a multi-layered structure may include metal layers. The metal layers may have a three-layer structure of, for example, titanium/aluminum/titanium. The multi-layered conductive layer may include at least one metal layer and at least one transparent conductive layer.

When the first conductive layer 202 and the second conductive layer 204 include a metal layer, the first conductive layer 202 and the second conductive layer 204 may be opaque. Accordingly, the first conductive layer 202 and the second conductive layer 204 may be patterned to non-overlap the light emitting region PXA, and to overlap non-light emitting region NPXA. As being non-overlapping, elements may be adjacent to each other and/or spaced apart from each other along a plane.

One of the second sensing insulating layer 203 or the cover insulating layer 205 may include an inorganic film. The inorganic film may include at least one among aluminum oxide, titanium oxide, silicon oxide, silicon nitride, silicon oxynitride, zirconium oxide, and hafnium oxide.

One of the second sensing insulating layer 203 or the cover insulating layer 205 may include an organic film. The organic film may include at least any one of an acrylic-based resin, a methacrylate-based resin, polyisoprene, a vinyl-based resin, an epoxy-based resin, a urethane-based resin, a cellulose-based resin, a siloxane-based resin, a polyimide-based resin, a polyamide-based resin, and a perylene-based resin.

A portion of the first conductive layer 202 and the second conductive layer 204 may be connected to each other through a contact hole CNT defined in the second sensing insulating layer 203.

As shown in FIG. 2B, a display module DMa according to an embodiment of the invention may further include an anti-reflection layer OTFa disposed on the input sensing layer ISP. The anti-reflection layer OTFa may be directly disposed on the input sensing layer ISP through a roll-to-roll process. In this case, the optical film OTF shown in FIG. 1C and the first adhesive film AF1 (see FIG. 1C) disposed between the optical film OTF and the input sensing layer ISP may be omitted.

The anti-reflection layer OTFa may include a light blocking pattern 310, a color filter 320, and a planarization layer 330.

A material constituting the light blocking pattern 310 is not particularly limited as long as the material absorbs light. The light blocking pattern 310 is a layer which is black in color, and in an embodiment, the light blocking pattern 310 may include a black coloring agent. The black coloring agent may include a black dye and a black pigment. The black coloring agent may include carbon black, a metal such as chromium, or an oxide thereof.

The light blocking pattern 310 may overlap the first and second conductive layers 202 and 204, on a plane. The light blocking pattern 310 may prevent reflection of external light by the first and second conductive layers 202 and 204.

An opening 310-OP may be defined in the light blocking pattern 310. The opening 310-OP of the light blocking pattern 310 may overlap the first electrode AE, and may have an area (e.g., a planar area) greater than or equal to a planar area of the opening 70-OP of the pixel defining film 70. The opening 310-OP of the light blocking pattern 310 may define the light emitting region PXA. The light emitting region PXA may be defined as a region in which light generated from the light emitting element 100PE is emitted to the outside of the display module DM (or the display device DD or the electronic device ED). As the planar area of the light emitting region PXA increases, luminance of an image IM may increase.

The color filter 320 may overlap at least the light emitting region PXA. The color filter 320 may further overlap the non-light emitting region NPXA. A portion of the color filter 320 may be disposed on the light blocking pattern 310. The color filter 320 may transmit the light generated from the light emitting element 100PE and block some wavelength bands of external light. Accordingly, the color filter 320 may reduce the reflection of external light by the first electrode AE or the second electrode CE. The color filter 320 may be provided in plural along the display panel DP, to include a plurality of color filters 320 (or color filter patterns) within a color filter layer.

The planarization layer 330 may cover the light blocking pattern 310 and the color filter 320. The planarization layer 330 may include an organic insulating material, and provide a flat upper surface.

As an example of the invention, the anti-reflection layer OTFa may further include a first light control layer 340 and a second light control layer 350. The first light control layer 340 is disposed on the planarization layer 330. The first light control layer 340 may overlap the light blocking pattern 310 on a plane. An opening 340-OP may be defined in the first light control layer 340. The opening 340-OP of the first light control layer 340 may overlap the first electrode AE, and may have an area (e.g., a planar area) greater than or equal to that of the opening 310-OP of the light blocking pattern 310. The opening 340-OP of the first light control layer 340 may correspond to the light emitting region PXA.

The first light control layer 340 may include an organic insulating material. The organic insulating material may include at least any one of an acrylic-based resin, a methacrylate-based resin, polyisoprene, a vinyl-based resin, an epoxy-based resin, a urethane-based resin, a cellulose-based resin, a siloxane-based resin, a polyimide-based resin, a polyamide-based resin, and a perylene-based resin. However, this is presented as an example, and the organic insulating material is not limited to the above examples.

The second light control layer 350 is disposed on the planarization layer 330 to cover the first light control layer 340. The second light control layer 350 (e.g., a high refractive index layer) may have a higher refractive index than the first light control layer 340 (e.g., a low refractive index layer). The second light control layer 350 may include an organic insulating material having a higher refractive index than that of the first light control layer 340. The second light control layer 350 may be provided to fill the opening 340-OP of the first light control layer 340. The second light control layer 350 may have a flat upper surface.

Light output from light emitting element 100PE may be emitted not only in a front direction, for example, in the third direction DR3, but also in a side direction. Light efficiency may be determined with respect to the light emitted in the front direction. According to an embodiment of the invention, the front light emitted from the light emitting element 100PE in the front direction may pass through the second light control layer 350 and be output to outside the display module DMa. The side light emitted from the light emitting element 100PE in the side direction may be output from the display module DMa, at an inclined angle with respect to the front light.

The side light may be refracted or totally reflected due to a difference in refractive index between the first light control layer 340 and the second light control layer 350. Accordingly, light path of the side light may shift to the front direction, that is, the third direction DR3 or a direction adjacent to the third direction DR3. As such, the shift in the light path of the side light to the front direction may result in increased light efficiency of the display device DD.

Figure 3A:
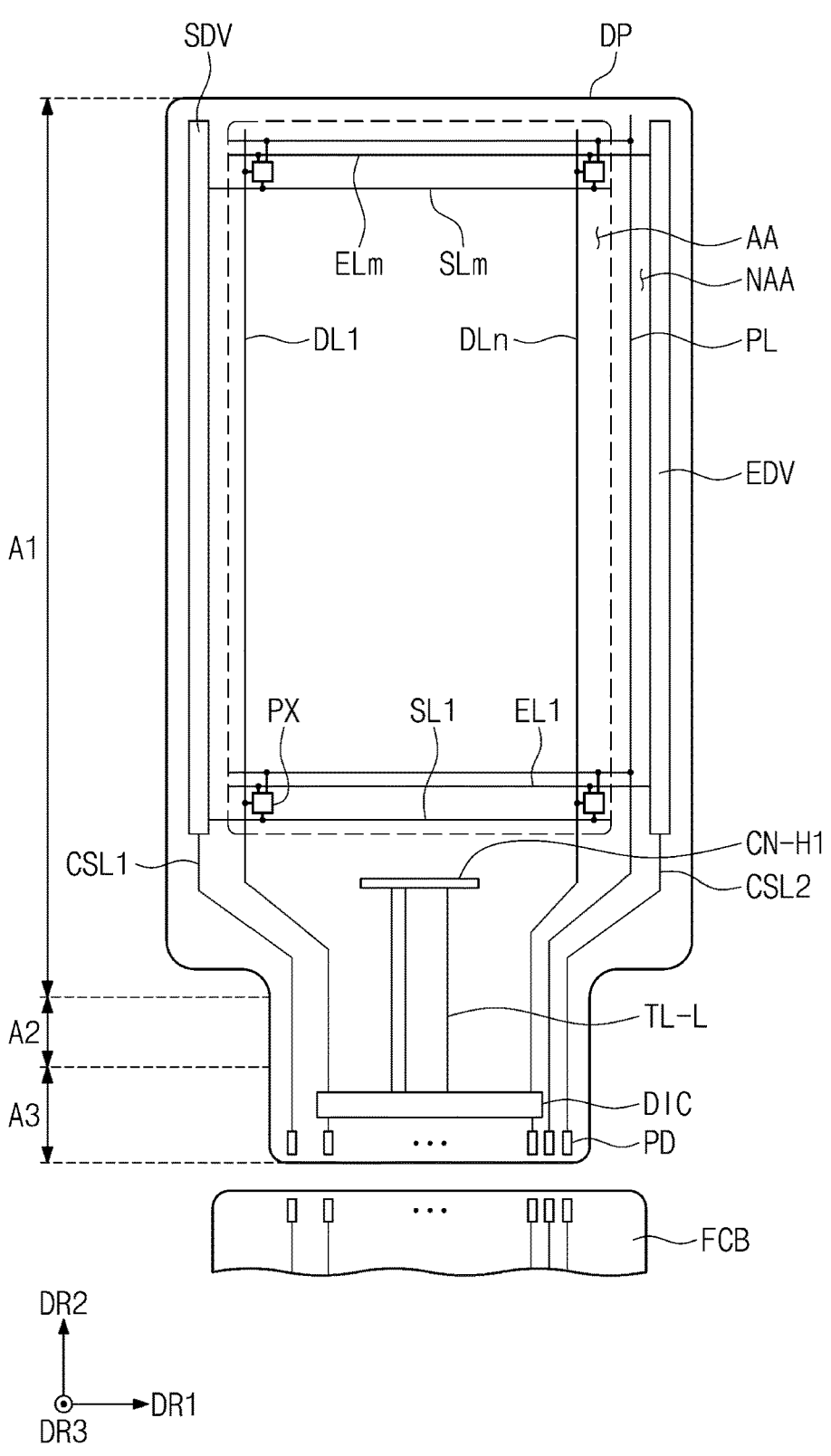
FIG. 3A is a plan view of a display panel according to an embodiment of the invention.
Figure 3B:
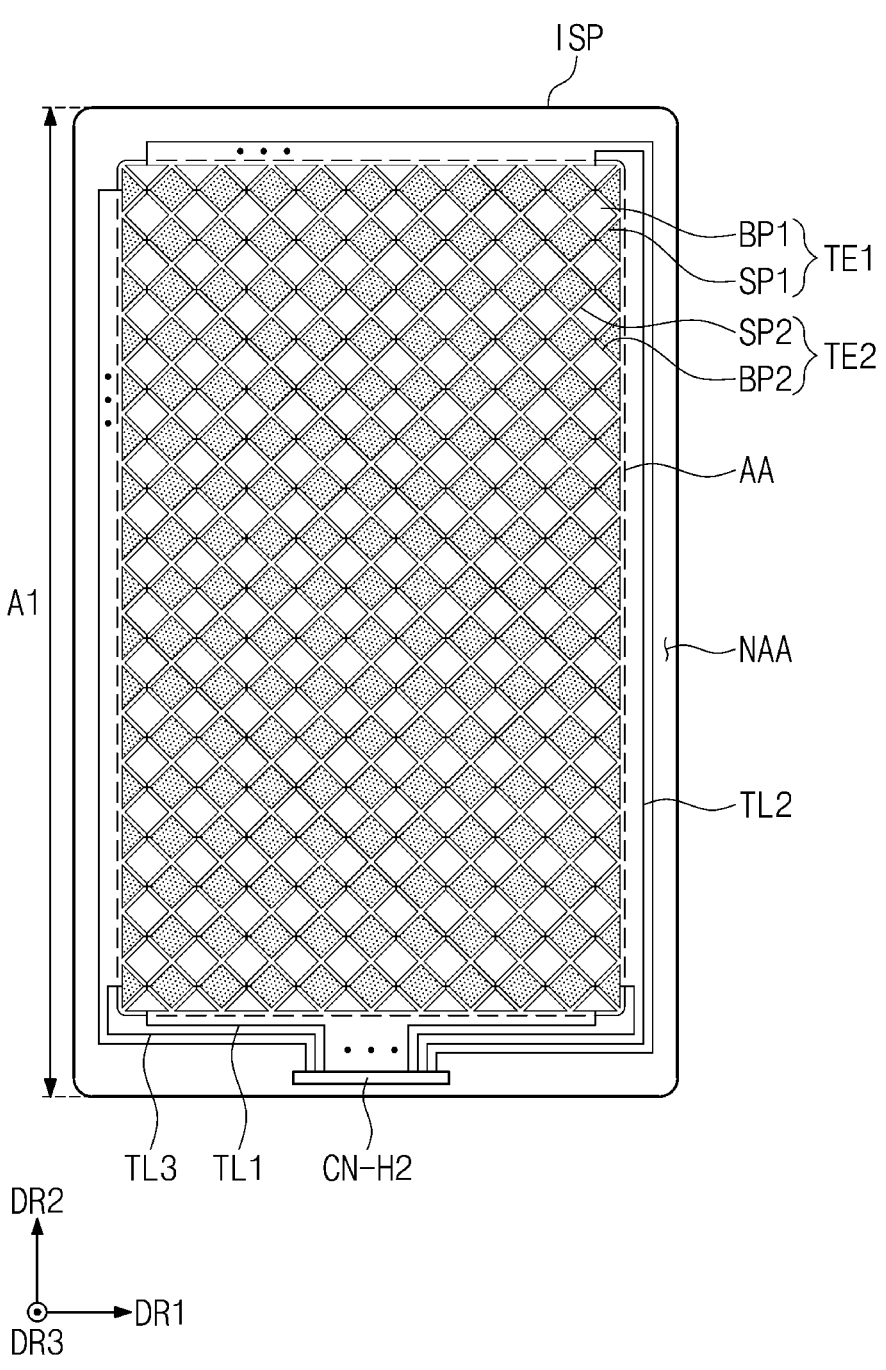
FIG. 3B is a plan view of an input sensing layer according to an embodiment of the invention.

FIG. 3A is a plan view of a display panel DP according to an embodiment of the invention. FIG. 3B is a plan view of an input sensing layer ISP according to an embodiment of the invention.

Referring to FIG. 3A, the display panel DP according to an embodiment of the invention may be divided into a first region A1, a second region A2, and a third region A3. The first to third regions A1, A2, and A3 of the display panel DP shown in FIG. 3A correspond to the first to third regions A1, A2, and A3 of the display module DM described in FIG. 1B, respectively. As used herein, "a region/portion corresponds to another region/portion" indicates that "the regions/portions overlap each other" or correspond to each other along the thickness direction, but is not limited to having the same size of area.

The display panel DP according to an embodiment may include an active region AA in which the pixel PX is disposed and a peripheral region NAA adjacent to the active region AA. The active region AA and the peripheral region NAA respectively correspond to the active region AA and the peripheral region NAA described in FIG. 1B. The active region AA corresponds to a region in which the pixel PX is disposed within the first region A1. The peripheral region NAA includes a remaining region of the first region A1 excluding the region in which the pixel PX is disposed, together with the second region A2 and the third region A3.

The display panel DP may include a scan driver SDV and an emission driver EDV which are disposed in the peripheral region NAA. The driving chip DIC may be mounted on the peripheral region NAA of the display panel DP. The driving chip DIC may be a data driver.

The display panel DP may include the pixel PX provided in plural including a plurality of pixels PX, a scan line provide in plural including a plurality of scan lines SL1 to SLm, a data line provided in plural including a plurality of data lines DL1 to DLn, a light emitting line provided in plural including a plurality of light emitting lines EL1 to ELm, first and second control lines CSL1 and CSL2, a power line PL, and a plurality of pads PD. In this case, 'm' and 'n' are natural numbers. The pixels PX may be connected to the scan lines SL1 to SLm, the data lines DL1 to DLn, and the light emitting lines EL1 to ELm.

The scan lines SL1 to SLm may extend in the first direction DR1 and be connected to the scan driver SDV. The data lines DL1 to DLn extend in the second direction DR2 and may pass through the second region A2 from the first region A1 to be connected to the driving chip DIC disposed in the third region A3. The light emitting lines EL1 to ELm may extend in the first direction DR1 and be connected to the emission driver EDV. As extending in a direction, a major dimension or a maximum dimension of an element may extend in the direction to define an extension direction, without being limited thereto.

The power line PL may include a portion extending in the first direction DR1 and a portion extending in the second direction DR2. The portion extending in the first direction DR1 and the portion extending in the second direction DR2 may be disposed on different layers from each other. A portion of the power line PL, which extends in the second direction DR2 may extend from the first region A1 to the third region A3 via the second region A2. The power line PL may provide a reference voltage to the pixels PX.

The first control line CSL1 may be connected to the scan driver SDV and may extend from the first region A1 to the third region A3, via the second region A2. The second control line CSL2 may be connected to the emission driver EDV and may extend from the first region A1 to the third region A3, via the second region A2.

A pad PD provided in plural may include the pads PD disposed adjacent to an end of the third region A3. The end of the third region A3 may define a distal end or end portion of the display panel DP. The driving chip DIC, the power line PL, the first control line CSL1, and the second control line CSL2 may be connected to the pads PD. The flexible circuit film FCB may overlap the end of the third region A3 of the display panel DP and be disposed on (or facing) the display panel DP, at the end of the display panel DP. The flexible circuit film FCB may include pads corresponding to the pads PD of the display panel DP, and may be electrically connected to the display panel DP, at the pads PD, such as through an anisotropic conductive adhesive layer.

The display panel DP according to an embodiment may include a first contact hole CN-H1 defined in the first region A1. The display panel DP may include extension sensing lines TL-L extending from the first contact hole CN-H1 to the third region A3, via the first region A1 and the second region A2. The extension sensing lines TL-L may be connected in one-to-one correspondence with sensing lines among sensing lines TL1, TL2, and TL3, which will be described later.

FIG. 3A shows that the extension sensing lines TL-L are disposed between the data lines DL1 to DLn, but the embodiment of the invention is not limited thereto. In an embodiment, the data lines DL1 to DLn may be disposed between the extension sensing lines TL-L, and accordingly, a plurality of first contact holes CN-H1 may be provided with the data lines DL1 to DLn therebetween, but the embodiment of the invention is not limited thereto.

Referring to FIG. 3B, the input sensing layer ISP according to an embodiment may include sensing electrodes TE1 and TE2 and sensing lines TL1, TL2, and TL3. The input sensing layer ISP may be formed only on a region overlapping the first region A1 of the display panel DP, when directly disposed on the display panel DP through a roll-to-roll process.

The input sensing layer ISP may acquire information on external inputs through changes in capacitance between the first sensing electrodes TE1 and the second sensing electrodes TE2. The first sensing electrodes TE1 may be arranged along the first direction DR1, and may each extend along the second direction DR2. Each of the first sensing electrodes TE1 may include a first sensing pattern SP1 and a first connection pattern BP1.

The first sensing pattern SP1 is disposed in the active region AA. The first sensing pattern SP1 may have a rhombus shape. However, this is presented as an example, and the first sensing pattern SP1 may have various shapes and is not limited to any one embodiment.

The first connection pattern BP1 is disposed in the active region AA. The first connection pattern BP1 may be disposed between adjacent first sensing patterns SP1. The first connection pattern BP1 may be disposed on (or in) different layers from the first sensing pattern SP1, to be connected to each other through a sensing contact hole.

The second sensing electrodes TE2 may be arranged along the second direction DR2, and may each extend along the first direction DR1. Each of the second sensing electrodes TE2 may include a second sensing pattern SP2 and a second connection pattern BP2.

The second sensing pattern SP2 may be spaced apart from the first sensing pattern SP1. The first sensing pattern SP1 and the second sensing pattern SP2 may transmit and receive independent electrical signals through non-contact.

The second sensing pattern SP2 may have the same shape as the first sensing pattern SP1. For example, the second sensing pattern SP2 may have a rhombus shape. However, this is presented as an example, and the second sensing pattern SP2 may have various shapes and is not limited to any one embodiment.

The second connection pattern BP2 may be disposed between adjacent second sensing patterns SP2. For convenience of description, the second sensing electrode TE2 is described to be divided into the second sensing pattern SP2 and the second connection pattern BP2, but the second sensing electrode TE2 may be substantially provided as a single pattern.

According to an embodiment, the first connection pattern BP1 may correspond to the first conductive layer 202 described in FIG. 2A. The first sensing pattern SP1, the second sensing pattern SP2, and the second connection pattern BP2 may correspond to the second conductive layer 204 described in FIG. 2A. That is, the second sensing electrode TE2 may be disposed on (or in) the same layer as the first sensing pattern SP1. In this case, the first sensing pattern SP1 and the second sensing electrode TE2 may be provided as a plurality of mesh lines extending in an oblique direction with respect to each of the first direction DR1 and the second direction DR2. The plurality of mesh lines may be respective portions if the same material layer (e.g., the second conductive layer 204). The mesh lines may be solid portions of a conductive layer which are spaced apart from each other, to define a mesh pattern. As being in a same layer, elements may be formed (or provided) in a same process and/or as including a same material as each other, elements may be respective portions (or patterns) of a same material layer, elements may be on a same layer by forming an interface with a same underlying or overlying layer, etc., without being limited thereto.

The sensing lines TL1, TL2, and TL3 are disposed in the peripheral region NAA. The sensing lines TL1, TL2, and TL3 may include first sensing lines TL1, second sensing lines TL2, and third sensing lines TL3.

The first sensing lines TL1 are respectively connected to the first sensing electrodes TEL In the present embodiment, the first sensing lines TL1 are respectively connected to lower ends along the second direction DR2, at both of opposing ends along the first direction DR1, of the first sensing electrodes TEL The second sensing lines TL2 are respectively connected to upper ends along the second direction DR2, at both of opposing ends along the first direction DR1, of the first sensing electrodes TE1. According to an embodiment of the invention, the first sensing electrodes TE1 may be respectively connected to the first sensing lines TL1 and the second sensing lines TL2. Accordingly, sensitivity according to a region may be uniformly maintained for the first sensing electrodes TE1 which is relatively longer in length than the second sensing electrodes TE2.

While this is presented as an example, in the input sensing layer ISP according to an embodiment of the invention, the second sensing lines TL2 may be omitted, and the embodiment of the invention is not limited thereto.

The third sensing lines TL3 are respectively connected to ends along the first direction DR1, of second sensing electrodes TE2. In the present embodiment, the third sensing lines TL3 are respectively connected to left ends along the first direction DR1, at both ends along the second direction DR2, of the second sensing electrodes TE2.

The input sensing layer ISP may include a second contact hole CN-H2 overlapping the peripheral region NAA. The second contact hole CN-H2 may overlap (or correspond to) the first contact hole CN-H1 of the display panel DP, such as to be aligned with the first contact hole CN-H1. The sensing lines TL1, TL2, and TL3 of the input sensing layer ISP, may be connected to corresponding extension sensing lines TL-L of the display panel DP, through the second contact hole CN-H2 defined in the input sensing layer ISP together with the first contact hole CN-H1 defined in the display panel DP. Accordingly, the sensing electrodes TE1 and TE2 of the input sensing layer ISP may be electrically connected to the flexible circuit film FCB connected to the display panel DP.

Figure 4A:
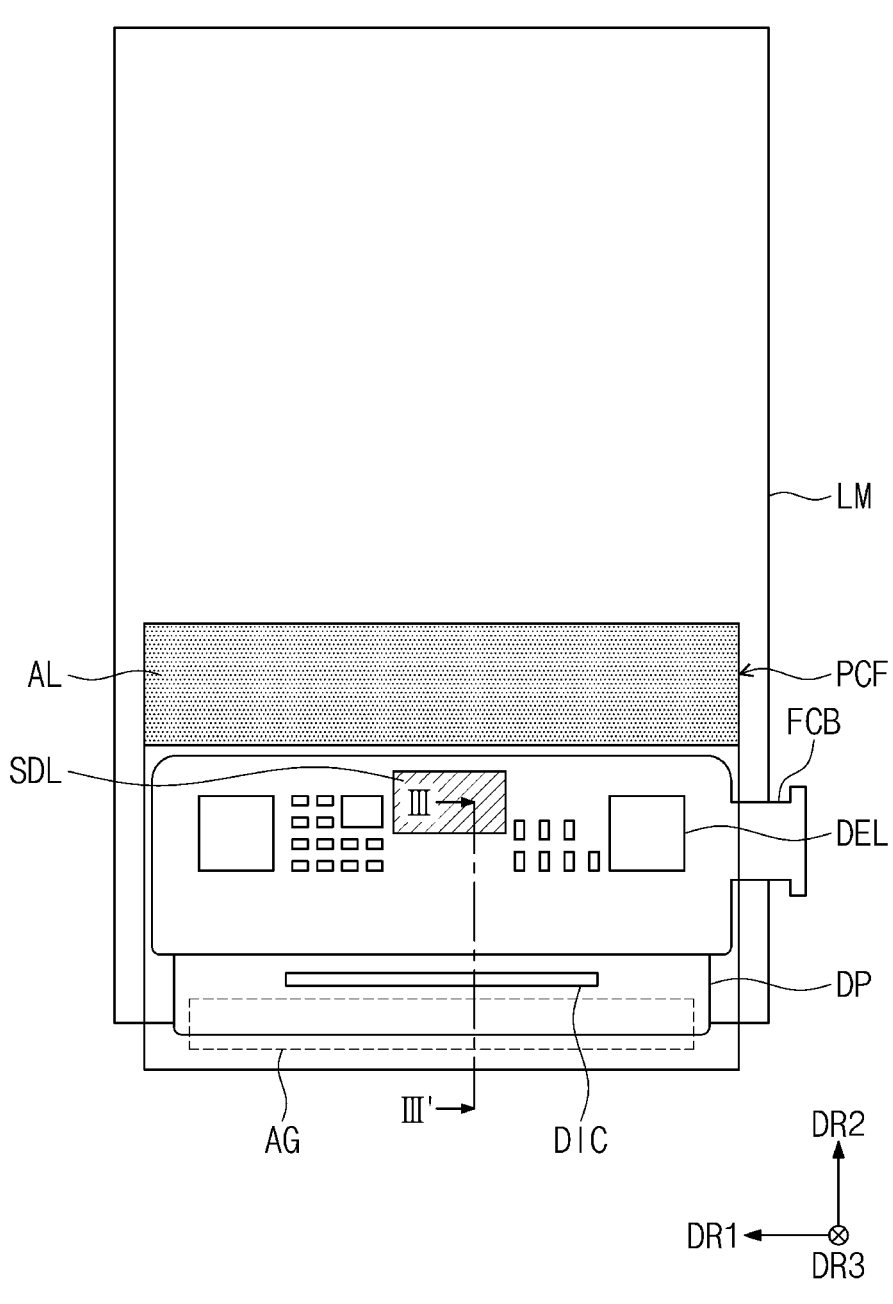
FIG. 4A is a rear plan view of a display device according to an embodiment of the invention.
Figure 4B:
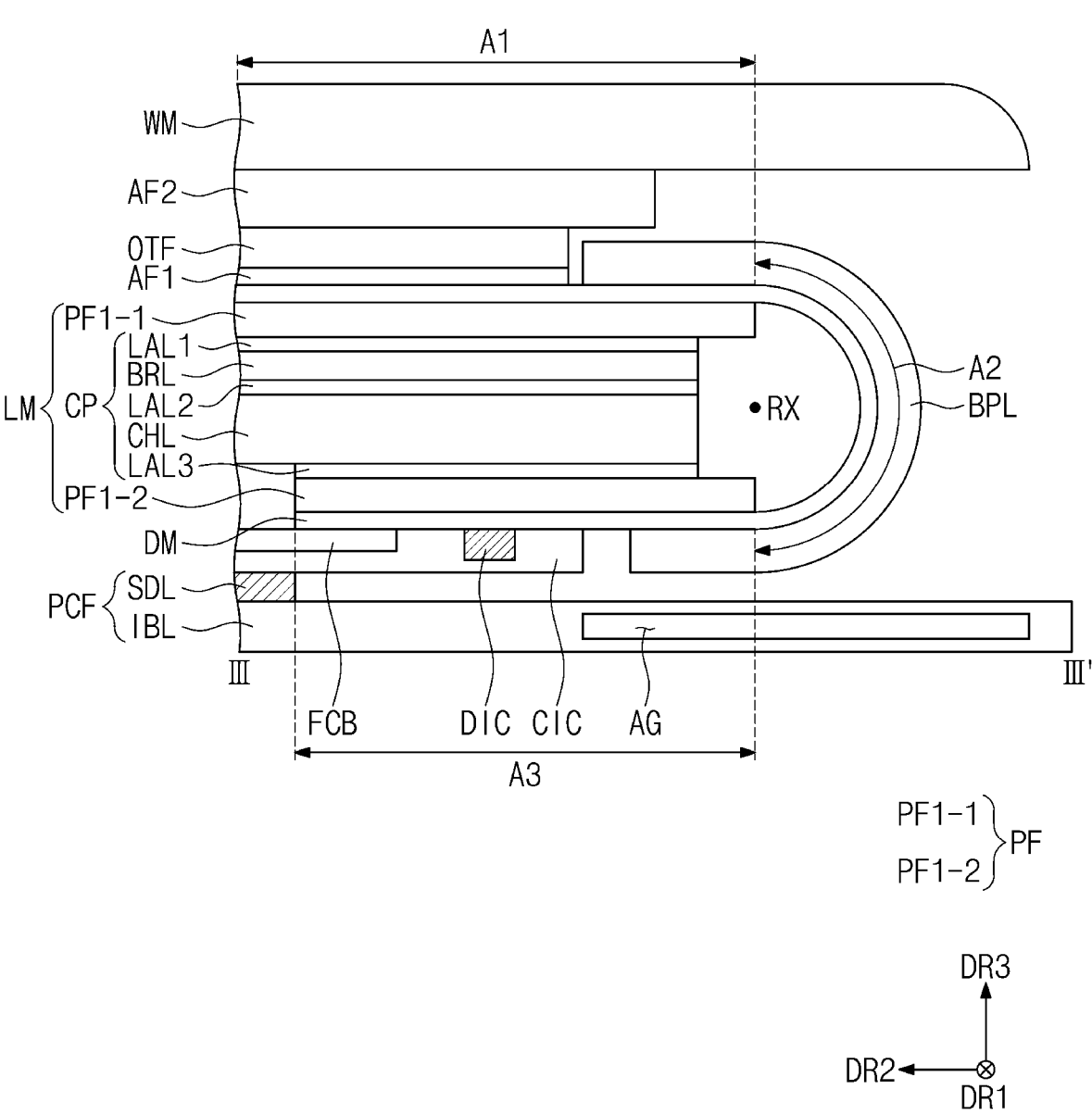
FIG. 4B is an enlarged cross-sectional view of a display device, taken along line shown in FIG. 4A.
Figure 4C:
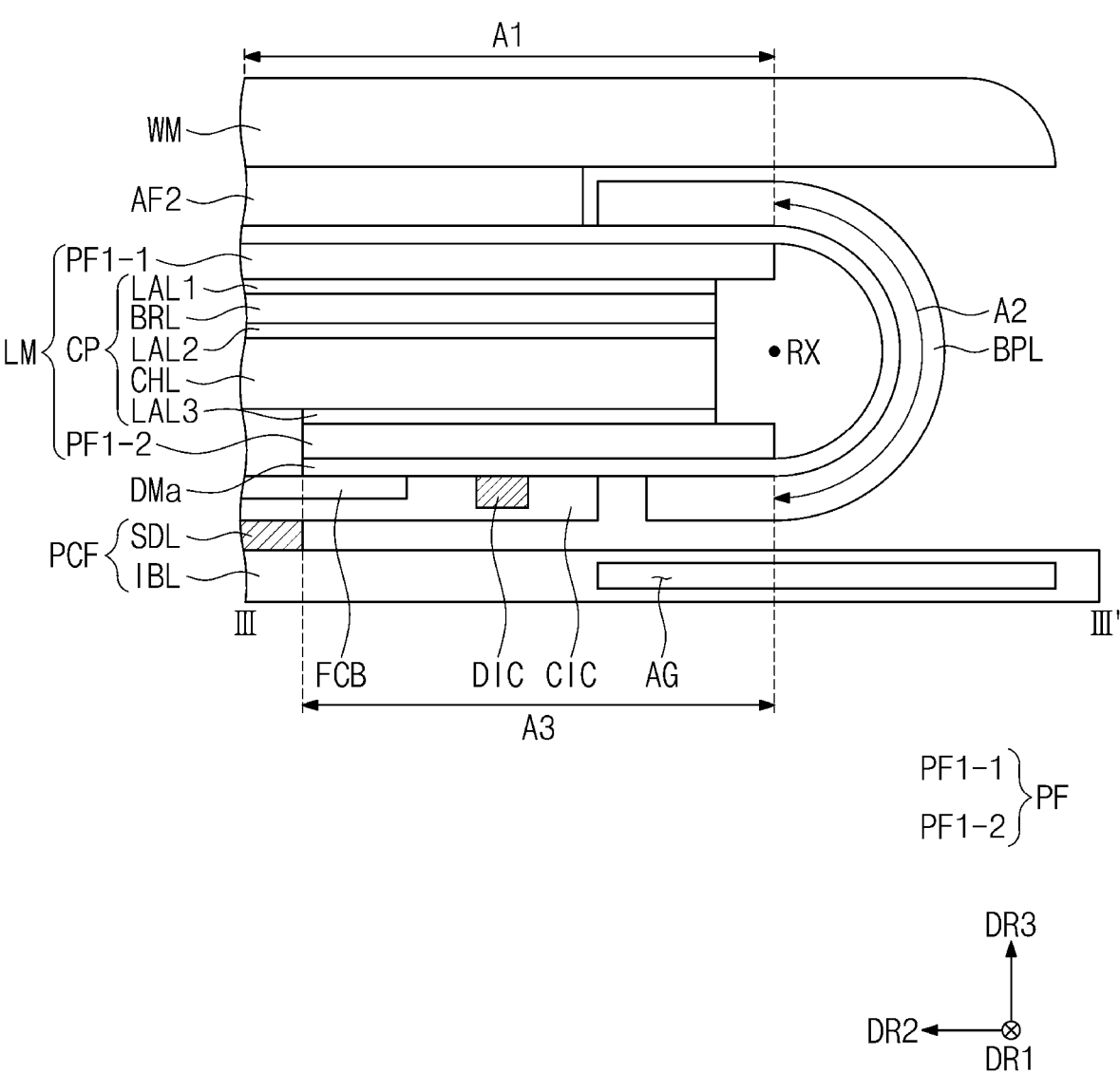
FIG. 4C is an enlarged cross-sectional view of a display device according to an embodiment of the invention.

FIG. 4A is a rear view of a display device DD according to an embodiment of the invention, and FIG. 4B is a cross-sectional view of a display device DD which is bent, taken along line shown in FIG. 4A. FIG. 4C is a cross-sectional view of a display device DD according to an embodiment of the invention.

Referring to FIGS. 1B, 4A, and 4B, the display module DM is bent at the second region A2 of the display module DM, with respect to the bending axis RX, and disposes the third region A3 on a rear surface of the lower module LM.

The display device DD may further include a bending protection layer BPL disposed along the second region A2 of the display module DM. The bending protection layer BPL may extend from the second region A2, to be further disposed on a portion of the first region A1 and/or a portion of the third region A3. The bending protection layer BPL may be bendable together with other layer of the display device DD, to be bent together with the second region A2. The second region A2 of the display device DD which is bent, defines an end portion of the display device DD which is exposed to outside the display device DD. The bending protection layer BPL protects the second region A2 from external shocks and controls a neutral plane of the display module DM at the second region A2. The bending protection layer BPL controls stress in the second region A2 to make the neutral plane close to signal lines disposed in the second region A2.

One end of the flexible circuit film FCB may be bonded to the display module DM, at the third region A3 of the display module DM, through a bonding process. The driving chip DIC may be mounted on the third region A3 of the display module DM.

The display device DD further includes a cover film CIC. The cover film CIC may block noise (e.g., electronic noise) formed around the flexible circuit film FCB and the driving chip DIC, and protect the flexible circuit film FCB and the driving chip DIC from risks such as shocks provided from the outside.

The adhesive layer AL and/or the step difference layer SDL may removably attach the insulating base layer IBL and the display module DM to each other. That is, the collective display module as including the lower module LM and/or the cover film CIC attached to the display module DM, may be removably attachable to the protective cover film PCF, by the adhesive layer AL and/or the step different layer SDL.

The cover film CIC may be bonded to the flexible circuit film FCB and the display module DM. According to an embodiment, the cover film CIC may be fixed to the flexible circuit film FCB and the display module DM, in an adhesive manner. The cover film CIC may cover a portion of the one end of the flexible circuit film FCB, and cover the driving chip DIC mounted on the third region A3 of the display module DM. As an example of the invention, the driving chip DIC may be entirely covered by the cover film CIC (e.g., an entirety of the driving chip DIC may be covered by the cover film CIC). A plurality of driving elements DEL mounted on the flexible circuit film FCB may be exposed to outside the display device DD, without being covered by the cover film CIC.

The lower module LM may include a panel protection film PF and a cover panel CP. The cover panel CP may include a barrier layer BRL and a cushion layer CHL. The cover panel CP may be further from the display module DM than the panel protection film PF. The panel protection film PF may be disposed below the display module DM to protect the display module DM. That is, the protection film PF may be disposed along a rear surface of the display module DM, which is opposite to a front surface thereof. The panel protection film PF may include polyethylene terephthalate. The panel protection film PF may include a first protection film PF1-1 protecting the first region A1 of the display module DM, and a second protection film PF1-2 protecting the third region A3 of the display module DM. The panel protection film PF is not disposed in and omitted from the second region A2 of the display module DM, such that bending may be smoothly operated in the second region A2 of the display module DM.

The barrier layer BRL of the cover panel CP may be disposed below the panel protection film PF, that is, further from the display module DM than the panel protection film PF. The barrier layer BRL may increase resistance against compressive force caused by external pressing. Therefore, the barrier layer BRL may serve to prevent the deformation of the display module DM. The barrier layer BRL may include a flexible plastic material such as polyimide or polyethylene terephthalate. In addition, the barrier layer BRL may be a colored film having low light transmittance. The barrier layer BRL may absorb light incident from the outside. For example, the barrier layer BRL may be a black synthetic resin film. When the display device DD is viewed from an upper side of the window WM, components disposed below the barrier layer BRL may not be viewed from the front side of the display device DD.

The cover panel CP further includes a first lower adhesive layer LAL1, a second lower adhesive layer LAL2, and a third lower adhesive layer LAL3. The first lower adhesive layer LAL1 is disposed between the first protection film PF1-1 and the barrier layer BRL to couple the first protection film PF1-1 with the barrier layer BRL. The second lower adhesive layer LAL2 is disposed between the cushion layer CHL and the barrier layer BRL to couple the cushion layer CHL with the barrier layer BRL. The second protection film PF1-2 may be coupled to a rear surface of the cushion layer CHL through the third lower adhesive layer LAL3. Within the display device DD which is bent, the first protection film PF1-1 and the second protection film PF1-2, may be coupled to each other, via the cover panel CP, without being limited thereto.

The cushion layer CHL of the cover panel CP may protect the display module DM from shocks delivered from a lower side of the electronic device ED. That is, the electronic device ED may have improved impact resistance through the cushion layer CHL.

A layer for other functions (e.g., a heat dissipation layer) in addition to the function of shock absorption or protection may be added to the cover panel CP.

The window WM is disposed on the display module DM. The optical film OTF may be disposed between the window WM and the display module DM. The optical film OTF and the display module DM may be bonded through the first adhesive film AF1, and the window WM and the optical film OTF may be bonded through the second adhesive film AF2. As an example of the invention, the optical film OTF may not overlap the bending protection layer BPL. That is, the optical film OTF may be spaced apart from one end of the bending protection layer BPL in the second direction DR2.

As shown in FIG. 2B, when the anti-reflection layer OTFa is included in the display module DMa, the optical film OTF and the first adhesive film AF1 may be omitted from the display device DD. In this case, as shown in FIG. 4C, the window WM may be coupled to the display module DMa through the second adhesive film AF2.

At the end portion of the display device DD which is bent, an end of the window WM may extend further outside than the bending protection layer BPL that covers the second region A2 of the display module DM. According to an embodiment, the second adhesive film AF2 may overlap the bending protection layer BPL.

Referring to again FIGS. 4A and 4B, the protection cover film PCF is disposed below the display module DM which is folded, and the lower module LM facing a rear surface of the display module DM which is folded. To be specific, the protection cover film PCF may be disposed below the rear surface of the lower module LM, and below the third region A3 of the display module DM which is disposed under the display module DM which is folded, to protect the display module DM and the flexible circuit film FCB (also disposed under the display module DM which is folded). When viewed on a plane, the protection cover film PCF may overlap the flexible circuit film FCB, along with overlapping the second region A2 and the third region A3 of the display module DM. At the end portion of the display device DD which is bent, an end of the protection cover film PCF may be disposed further outside than the end of the window WM.

The protection cover film PCF includes the insulating base layer IBL, the adhesive layer AL, and the step difference layer SDL. The insulating base layer IBL includes (or defines) an air gap AG within the insulating base layer, which overlaps the second region A2 when viewed on a plane. The air gap AG may be provided inside the insulating base layer IBL. The air gap AG may extend in the first direction DR1 parallel to the bending axis RX, to have a length in the first direction DR1, while a width is defined along the second direction DR2 and a depth is defined along the third direction DR3. The air gap AG may have a rectangular planar shape extending in the first direction DR1 when viewed on a plane. However, the shape of the air gap AG is not limited thereto, and may be variously modified. The shape of the air gap AG will be described later with reference to FIGS. 5A and 7B.

The adhesive layer AL is disposed between the insulating base layer IBL and the first region A1 of the display module DM. In particular, the adhesive layer AL is disposed between the insulating base layer IBL and the lower module LM. Referring to FIG. 4A, for example, the adhesive layer AL may be disposed not to overlap the flexible circuit film FCB when viewed on a plane.

The step difference layer SDL is disposed on the insulating base layer IBL. As an example of the invention, the step difference layer SDL may be disposed between the insulating base layer IBL and the flexible circuit film FCB. The step difference layer SDL may maintain a separation of the insulating base layer IBL from the flexible circuit film FCB at a predetermined interval. The step difference layer SDL may be disposed at a position that non-overlaps the driving chip DIC and the driving elements DEL (e.g., a position which is adjacent to or spaced apart from the driving chip DIC). The step difference layer SDL, the driving chip DIC and the driving elements DEL may be coplanar with each other.

A gap may be formed between the insulating base layer IBL, the driving chip DIC, and the driving elements DEL, through the step difference layer SDL. Accordingly, the step difference layer SDL may prevent the driving chip DIC and the driving elements DEL from being damaged by shocks delivered to the driving chip DIC and the driving elements DEL through the insulating base layer IBL. In addition, the driving chip DIC and the driving elements DEL may not contact an upper surface of the insulating base layer IBL. Accordingly, the driving chip DIC and the driving elements DEL may be prevented from being damaged by contact or friction with the protection cover film PCF.

The step difference layer SDL and the insulating base layer IBL are not in the form of a single body. As an example of the invention, the step difference layer SDL may have adhesive properties. The step difference layer SDL may be disposed to be spaced apart from the adhesive layer AL on a plane. However, the embodiment of the invention is not limited thereto. The step difference layer SDL and the adhesive layer AL may be in the form of a single body. The step difference layer SDL may include the same material as the adhesive layer AL. As an example of the invention, each of the step difference layer SDL and the adhesive layer AL may include an adhesive having light blocking properties.

The end of the window WM may extend further outside than the second region A2 of the display module DM which is bent. An end of the protection cover film PCF may extend further than the end of the window WM. The end of the protection cover film PCF may be disposed further outside than the end of the window WM. The end of the protection cover film PCF and the end of the window WM have a structure that extends further outside than the second region A2 of the display module DM which is bent, and protection performance for the second region A2 of the display module DM may be improved.

In addition, where the air gap AG is provided on the protection cover film PCF to overlap the second region A2 of the display module DM, shocks applied to the second region A2 from the outside may be buffered through the air gap AG as an impact-absorbing member. Accordingly, the protection performance of the protection cover film PCF may be further improved through the air gap AG. Thus, the protection cover film PCF may reliably protect a bending portion (e.g., the second region A2) of the display module DM which is bent at the bending portion in a process of transporting the display device DD for manufacturing the electronic device ED (see FIG. 1A).

Figure 5A:
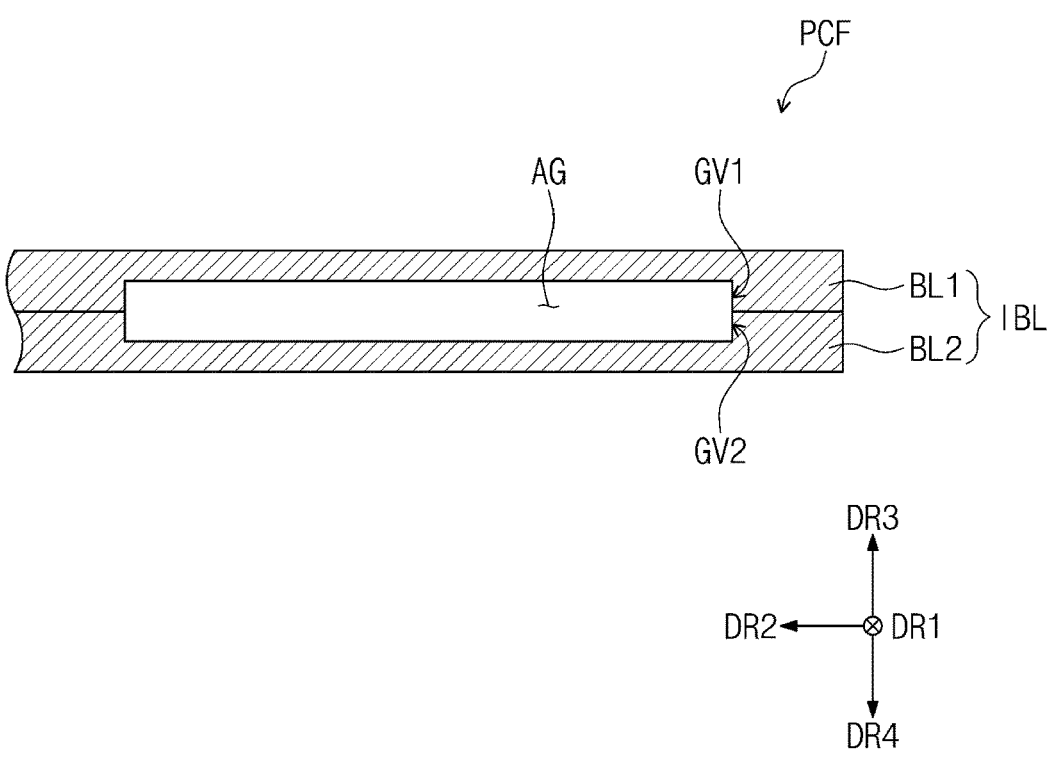
FIGS. 5A to 5C are partially enlarged cross-sectional views of a protection cover film according to embodiments of the invention.
Figure 5B:
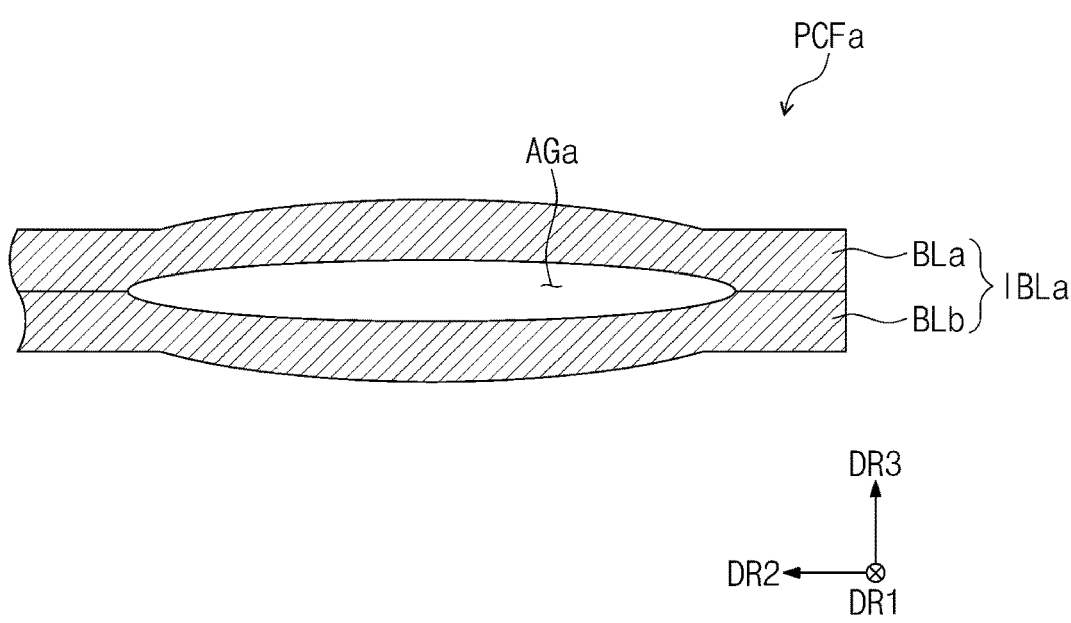
Figure 5C:
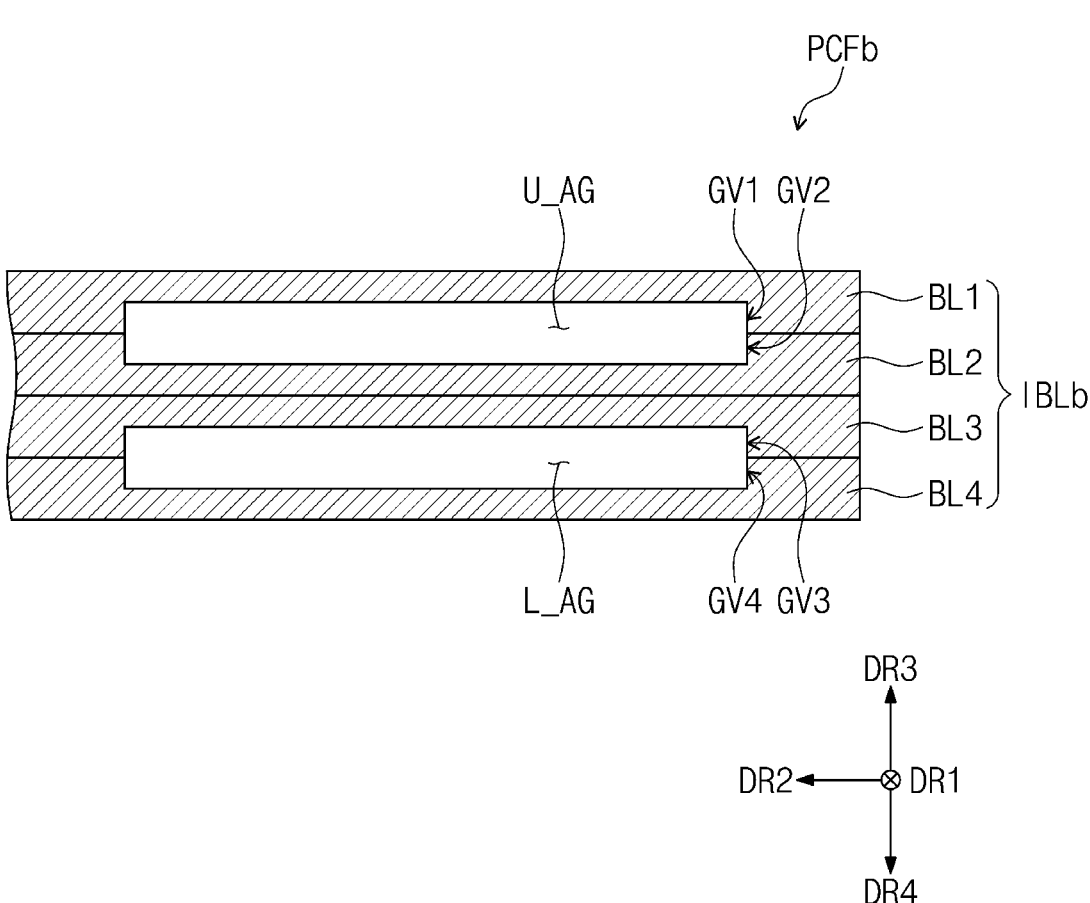

FIGS. 5A to 5C are partially enlarged cross-sectional views of a protection cover film PCF according to embodiments of the invention.

Referring to FIG. 5A, the protection cover film PCF according to an embodiment includes the air gap AG formed in (or defined by portions of) the insulating base layer IBL.

The insulating base layer IBL includes a first base layer BL1 (e.g., first base layer portion) and a second base layer BL2 (e.g., a second base layer portion) facing the first base layer BL1. The air gap AG may be an air layer or space formed (or provided) between the first and second base layers BL1 and BL2. The first base layer BL1 may include a first groove GV1 recessed in the third direction DR3, and the second base layer BL2 may include a second groove GV2 recessed in a fourth direction DR4 opposite to the third direction DR3. When the first and second base layers BL1 and BL2 are bonded to face each other, the grooves are aligned with each other, and the air gap AG may be formed between the first and second base layers BL1 and BL2 through the first and second grooves GV1 and GV2 aligned and facing each other. In the region where the air gap AG is formed, a maximum thickness of the first base layer BL1 may be reduced by a depth of the first groove GV1, and a maximum thickness of the second base layer BL2 may be reduced by a depth of the second groove GV2.

When viewed on a cross-section, the air gap AG may have a rectangular planar shape, but the cross-sectional shape of the air gap AG is not particularly limited. For example, the cross-sectional shape of the air gap AG may have any one among an elliptical shape, a circular shape, or a polygonal shape.

FIG. 5A shows a structure in which a uniform distance between the first and second base layers BL1 and BL2 (e.g., a uniform depth of the air gap AG) is maintained in the second direction DR2 through the air gap AG as an example. However, the embodiment of the invention is not limited thereto. As shown in FIG. 5B, a protection cover film PCFa may include an air gap AGa having an elliptical cross-sectional shape in an insulating base layer IBLa. In this case, the distance between first and second base layers BLa and BLb which defines the depth of the air gap Aga, may not be uniform along the second direction DR2.

The air gap AGa shown in FIG. 5B may be an air layer formed by separating inner surfaces of the first and second base layers BLa and BLb from each other. In this case, a thickness of each of the first and second base layers BLa and BLb does not decrease in the region where the air gap AGa is formed, but may be uniform.

Referring to FIG. 5C, a protection cover film PCFb according to an embodiment of the invention includes a plurality of air gaps U_AG and L_AG formed in an insulating base layer IBLb. As an example of the invention, the insulating base layer IBLb includes first to fourth base layers BL1, BL2, BL3, and BL4, which are sequentially stacked in the fourth direction DR4. The first and second base layers BL1 and BL2 are coupled to face each other, and the second and third base layers BL2 and BL3 are coupled to face each other. The third and fourth base layers BL3 and BL4 are also coupled to face each other.

The plurality of air gaps U_AG and L_AG may include an upper air gap U_AG (or a first air gap) formed between the first base layer BL1 and the second base layer BL2, and a lower air gap L_AG (or a second air gap) formed between the third base layer BL3 and the fourth base layer BL4.

The first base layer BL1 may include a first groove GV1 recessed in the third direction DR3, and the second base layer BL2 may include a second groove GV2 recessed in the fourth direction DR4 opposite to the third direction DR3. The third base layer BL3 may include a third groove GV3 recessed in the third direction DR3, and the fourth base layer BL4 may include a fourth groove GV4 recessed in the fourth direction DR4. When the first and second base layers BL1 and BL2 are coupled to align grooves and to face each other, the upper air gap U_AG (or a first sub air gap) is formed between the first and second base layers BL1 and BL2 through the first and second grooves GV1 and GV2. In addition, when the third and fourth base layers BL3 and BL4 are coupled to align grooves and to face each other, the lower air gap L_AG (or a second sub air gap) is formed between the third and fourth base layers BL3 and BL4 through the third and fourth grooves GV3 and GV4.

The two air gaps U_AG and L_AG are shown in the protection cover film PCFb of FIG. 5C as an example, but the number of air gaps is not limited thereto. Three or more air gaps sequentially disposed in the third direction DR3 may be formed in the insulating base layer IBLb.

Figure 6A:
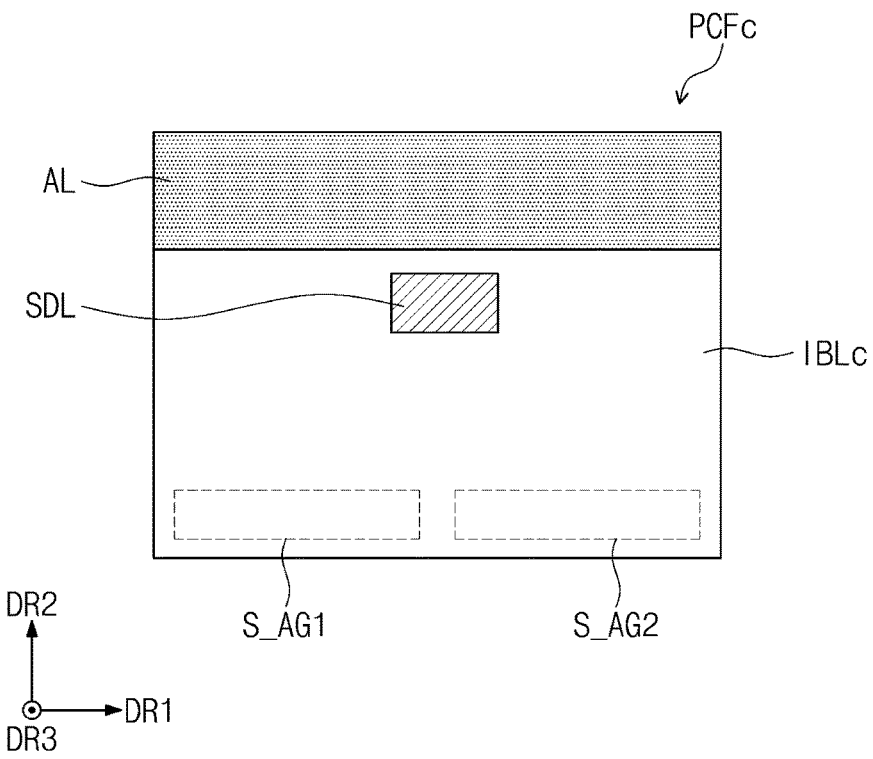
FIGS. 6A to 6D are plan views of a protection cover film according to embodiments of the invention.
Figure 6B:
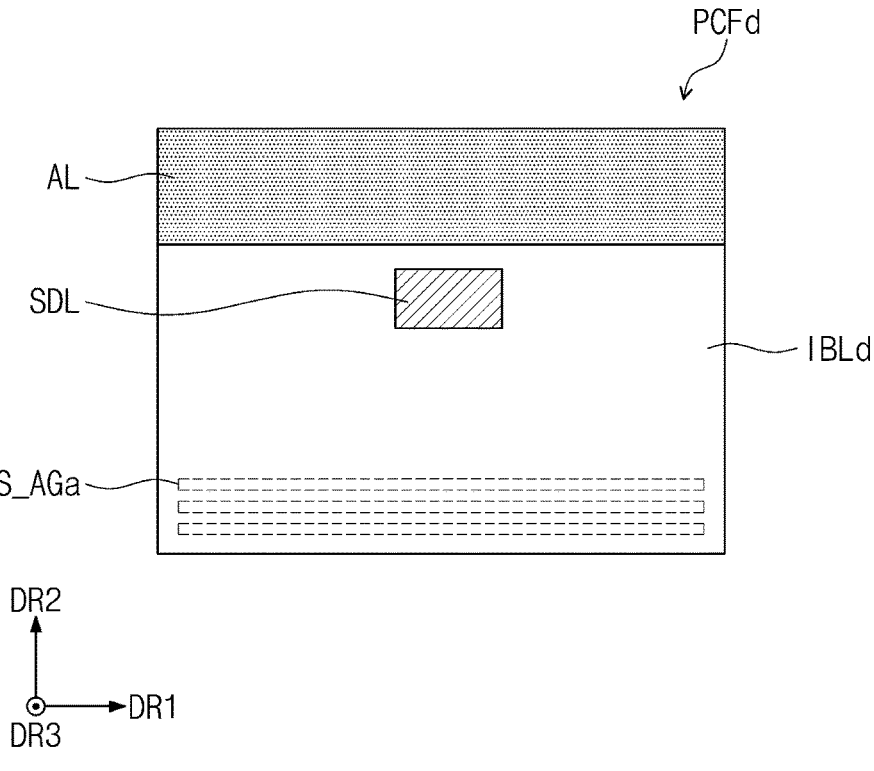

FIGS. 6A to 6D are plan views of a protection cover film PCF according to embodiments of the invention. FIG. 7A is a partially enlarged cross-sectional view of the protection cover film PCFd shown in FIG. 6B, and FIG. 7B is a partially enlarged cross-sectional view of the protection cover film PCFf shown in FIG. 6D.

Referring to FIG. 6A, a protection cover film PCFc according to an embodiment of the invention includes first and second sub air gaps S_AG1 and S_AG2 formed in an insulating base layer IBLc. The first and second sub air gaps S_AG1 and S_AG2 may be disposed to be spaced apart from each other in the first direction DR1. Each of the first and second sub air gaps S_AG1 and S_AG2 may have a rectangular shape extending in the first direction DR1 when viewed on a plane. However, the shape of each of the first and second sub air gaps S_AG1 and S_AG2 is not particularly limited.

Referring to FIGS. 6B and 7A, a protection cover film PCFd according to an embodiment of the invention includes a plurality of sub air gaps S_AGa formed in an insulating base layer IBLd. When viewed on a plane, each of the plurality of sub air gaps S_AGa may have a rectangular shape extending in the first direction DR1. The plurality of sub air gaps S_AGa may be disposed to be spaced apart from each other in the second direction DR2.

Referring to FIG. 7A, the insulating base layer IBLd includes a first base layer BL1 and a second base layer BL2 facing the first base layer BL1. The plurality of sub air gaps S_AGa may be a plurality of air layers formed between the first and second base layers BL1 and BL2. The first base layer BL1 may include a plurality of first sub grooves S_GV1 recessed in the third direction DR3, and the second base layer BL2 may include a plurality of second sub groove S_GV2 recessed in the fourth direction DR4 opposite to the third direction DR3. When the first and second base layers BL1 and BL2 are bonded to face each other, a plurality of sub air gaps S_AGa may be formed between the first and second base layers BL1 and BL2 through the plurality of first sub grooves S_GV1 and the plurality of second sub grooves S_GV2. In the region where the plurality of sub air gaps S_AGa are formed, a thickness of the first base layer BL1 is reduced by a depth of each of the plurality of first sub grooves S_GV1, a thickness of the second base layer BL2 may be reduced by a depth of each of the plurality of second sub grooves S_GV2.

When viewed on a cross-section, each of the plurality of sub air gaps S_AGa may have a rectangular shape, but the cross-sectional shape of the plurality of sub air gaps S_AGa is not particularly limited. For example, the cross-sectional shape of the plurality of sub air gaps S_AGa may have any one among an elliptical shape, a circular shape, or a polygonal shape.

Figure 6C:
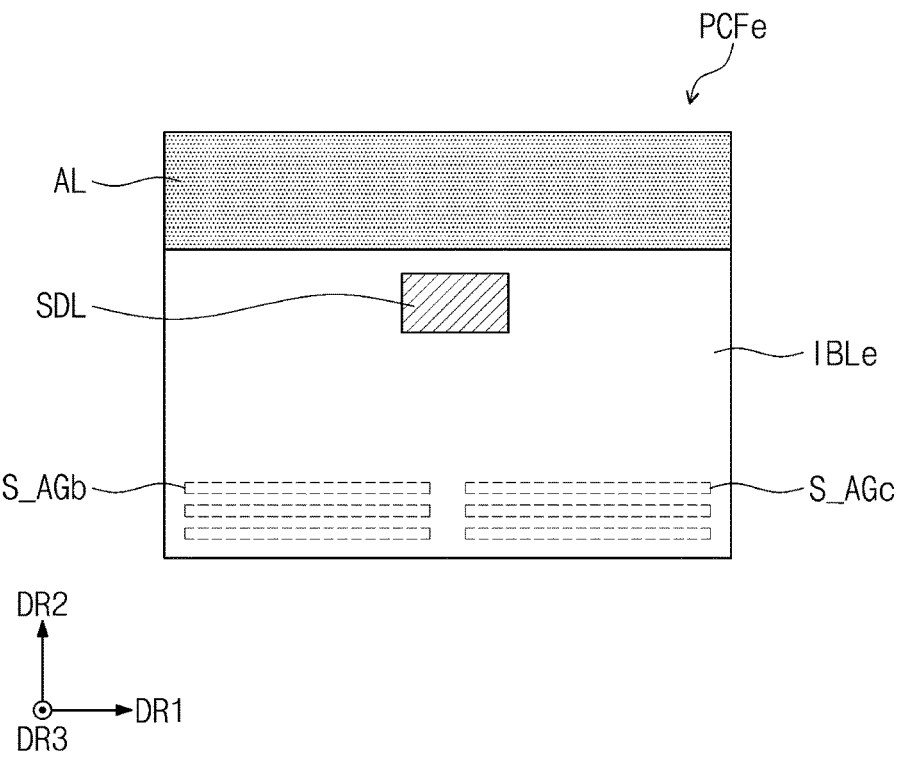
Figure 7A:
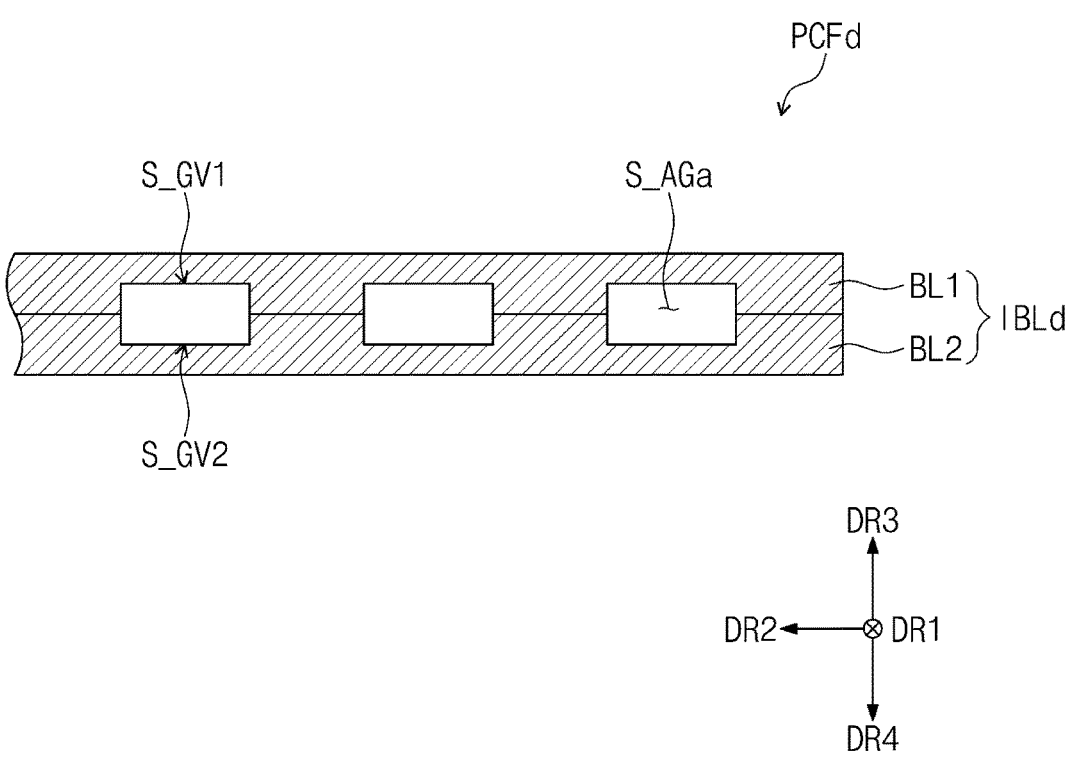
FIG. 7A is a partially enlarged cross-sectional view of the protection cover film shown in FIG. 6B.
Figure 7B:
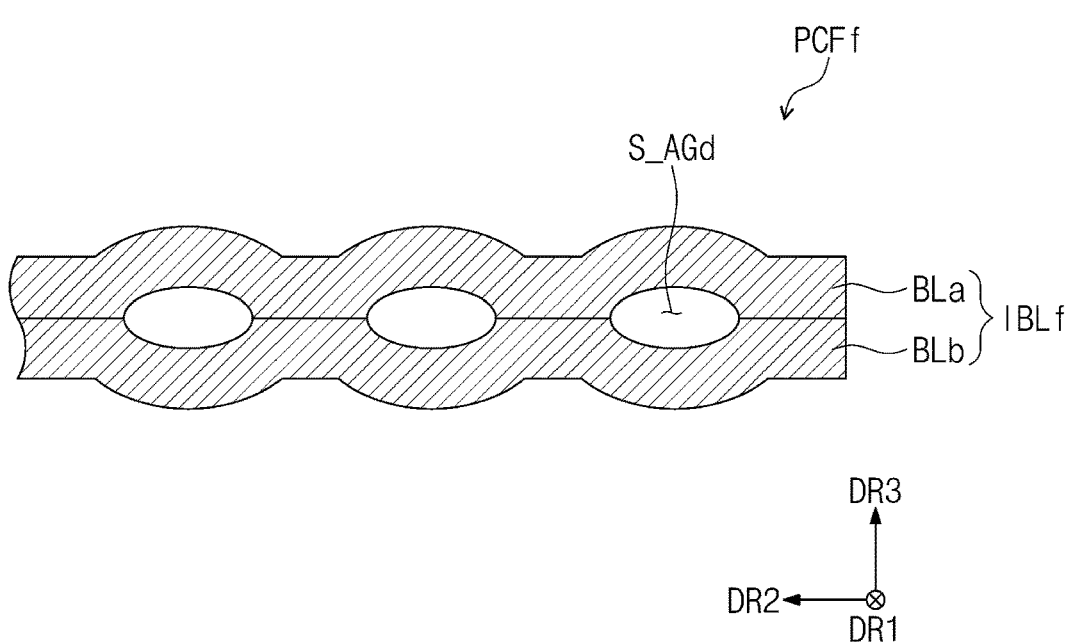
FIG. 7B is a partially enlarged cross-sectional view of the protection cover film shown in FIG. 6D.

Referring to FIG. 6C, a protection cover film PCFe according to an embodiment of the invention includes a plurality of first sub air gaps S_AGb and a plurality of second sub air gaps S_AGc formed in an insulating base layer IBLe. The plurality of first sub air gaps S_AGb are disposed to be spaced apart from each other in the second direction DR2, and the plurality of second sub air gaps S_AGc are disposed to be spaced apart from each other in the second direction DR2. The plurality of first sub air gaps S_AGb may be disposed to be spaced apart from the plurality of second sub air gaps S_AGc in the first direction DR1. Each of the plurality of first sub air gaps S_AGb may have a rectangular shape extending in the first direction DR1 when viewed on a plane. Each of the plurality of second sub air gaps S_AGc may have a rectangular shape extending in the first direction DR1 when viewed on a plane. However, the shape of each of the first and second sub air gaps S_AGb and S_AGc is not particularly limited.

Figure 6D:
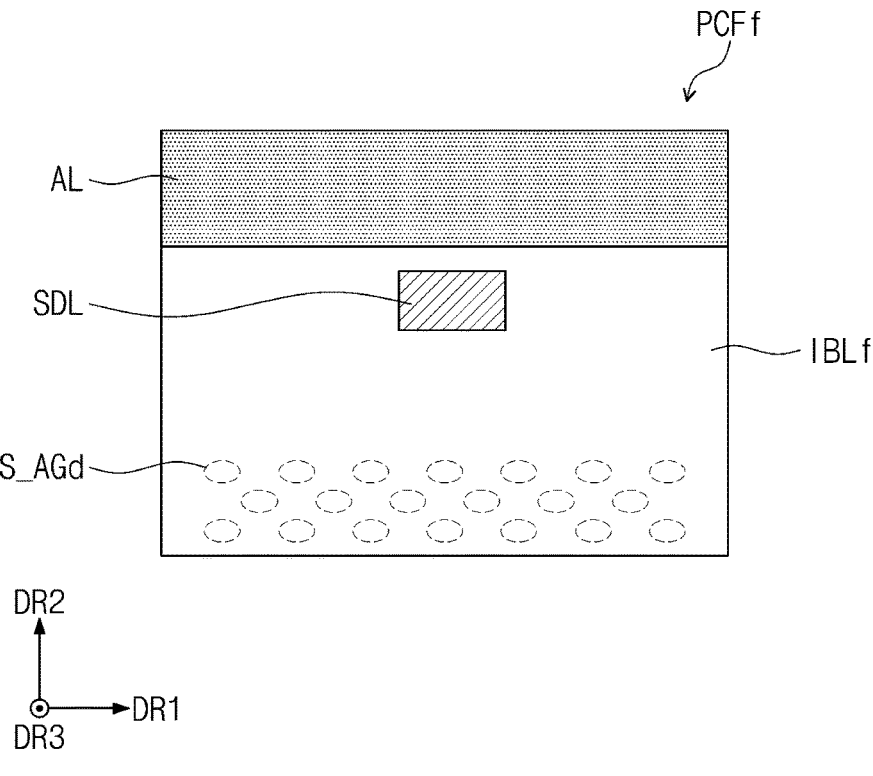

Referring to FIGS. 6D and 7B, a protection cover film PCFf according to an embodiment of the invention includes a plurality of sub air gaps S_AGd formed in an insulating base layer IBLf. When viewed on a plane, each of the plurality of sub air gaps S_AGd may have a circular shape or an elliptical shape. The plurality of sub air gaps S_AGd may be disposed to be spaced apart from each other in the first and second directions DR1 and DR2.

As shown in FIG. 7B, the insulating base layer IBLf includes a first base layer BLa and a second base layer BLb facing the first base layer BLa. The plurality of sub air gaps S_AGd may be a plurality of air layers formed between the first and second base layers BLa and BLb. Each of the plurality of sub air gaps S_AGd may have an elliptical cross-sectional shape in the insulating base layer IBLf. In this case, the distance between first and second base layers BLa and BLb may not be uniform in the second direction DR2.

The plurality of sub air gaps S_AGd may be air layers formed by separating the first and second base layers BLa and BLb. In this case, a thickness of each of the first and second base layers BLa and BLb does not decrease in the region where the plurality of sub air gaps S_AGd are formed, but may be uniform.

Figure 8A:
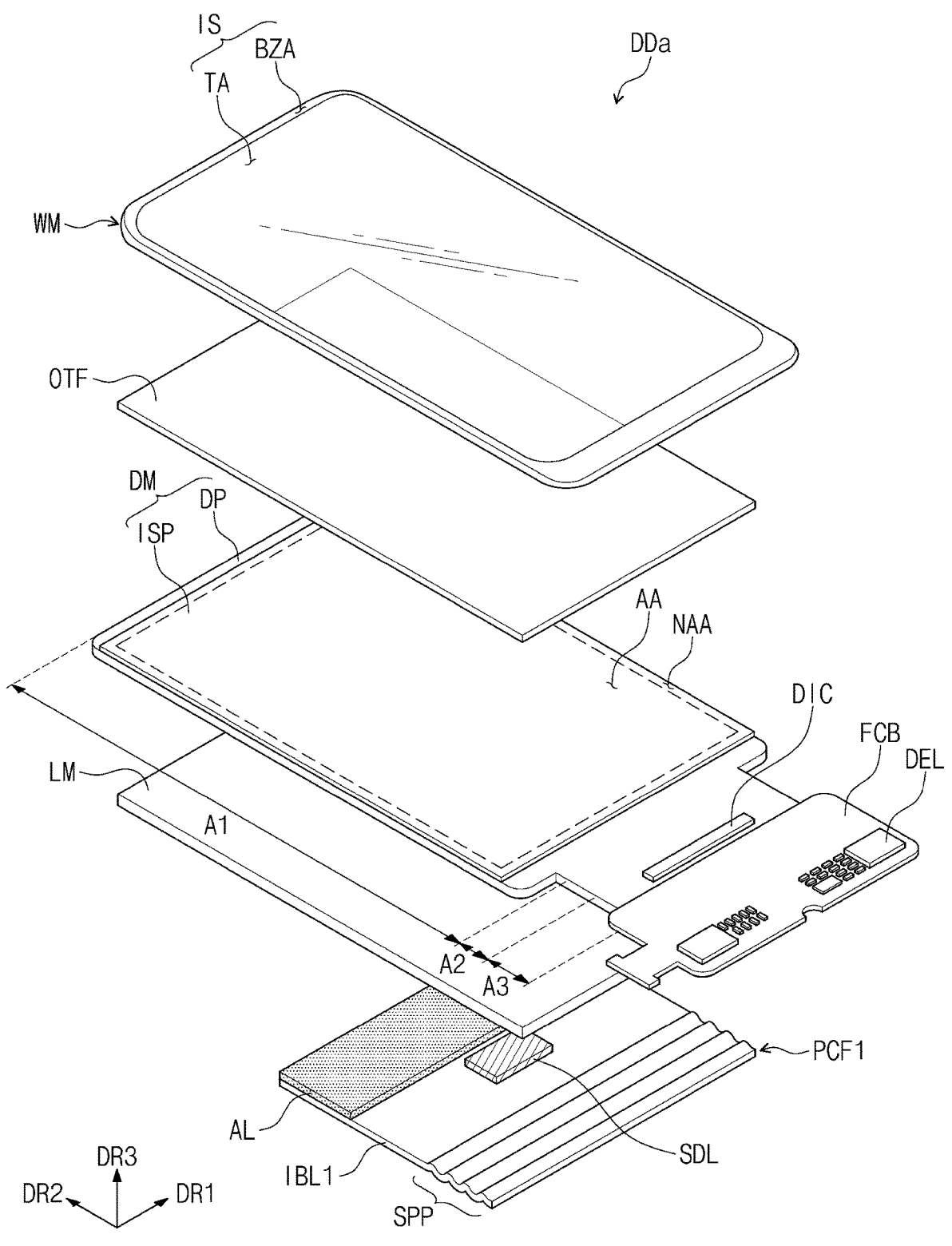
FIG. 8A is an exploded perspective view of a display device according to an embodiment of the invention.
Figure 8B:
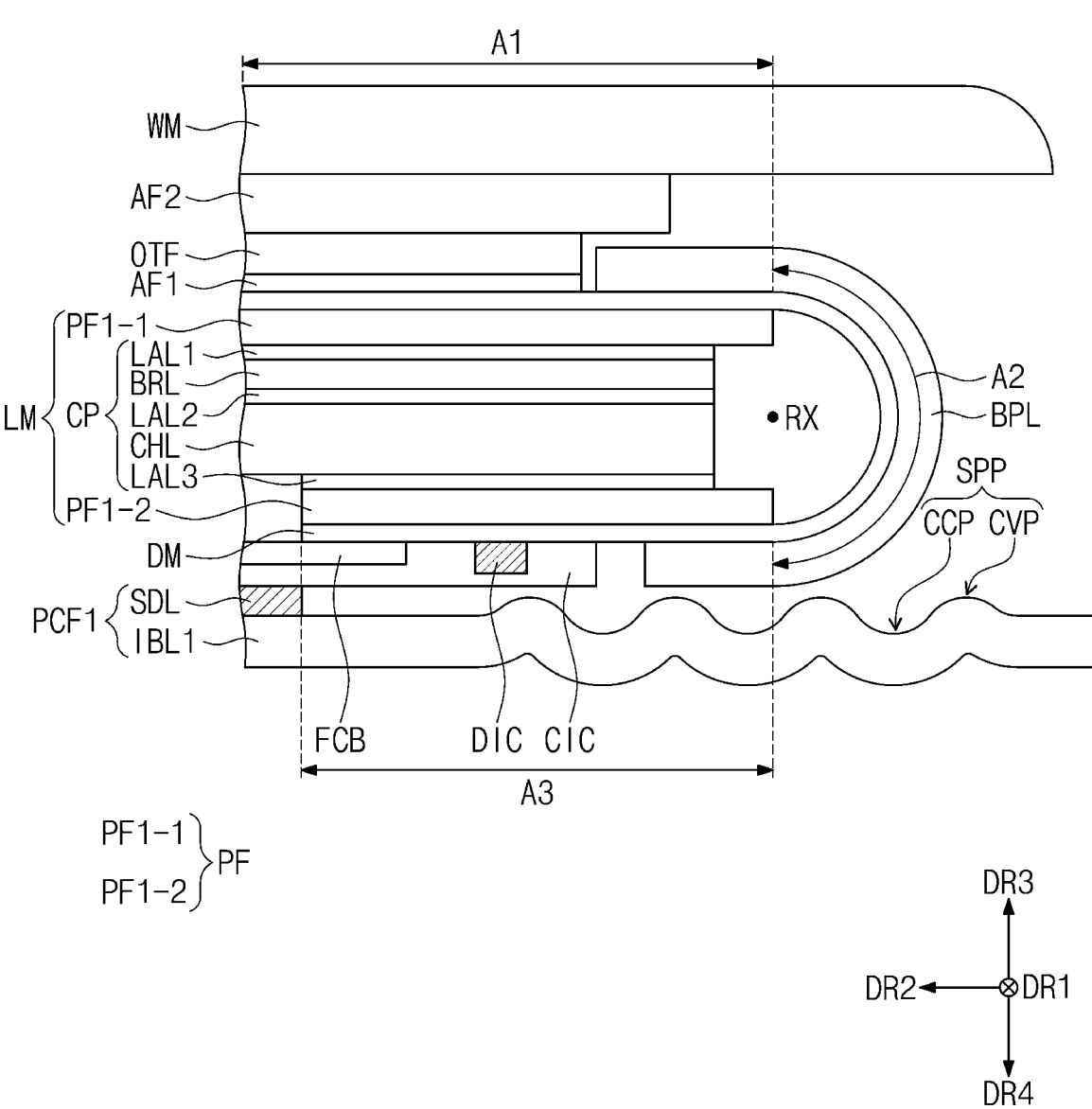
FIG. 8B is an enlarged cross-sectional view of a display device which is assembled, according to an embodiment of the invention.

FIG. 8A is an exploded perspective view of a display device according to an embodiment of the invention, and FIG. 8B is an assembly cross-sectional view of a display device according to an embodiment of the invention. Among the components shown in FIGS. 8A and 8B, the same reference numerals are used for the same components as those shown in FIGS. 1B and 4B, and detailed descriptions thereof will be omitted.

Referring to FIGS. 8A and 8B, a display device DDa according to an embodiment of the invention may include a protection cover film PCF1.

The protection cover film PCF1 is disposed below the display module DM which is bent, and the lower module LM under the display module DM which is bent. To be specific, the protection cover film PCF1 may be disposed below the rear surface of the lower module LM, and the third region A3 of the display module DM which is bent, to protect a bending region of the display module DM and the flexible circuit film FCB. The protection cover film PCF1 may have a rectangular tape shape. However, the shape of the protection cover film PCF1 is not limited thereto. The protection cover film PCF1 may have various shapes within ranges having a size enough to sufficiently cover the flexible circuit film FCB.

The protection cover film PCF1 includes an insulating base layer IBL1, an adhesive layer AL, and a step difference layer SDL. The insulating base layer IBL1 may include a transparent insulating material.

The adhesive layer AL is partially disposed on the insulating base layer IBL1. The adhesive layer AL may be disposed between the insulating base layer IBL1 and the lower module LM to fix the insulating base layer IBL1 to the lower module LM.

The step difference layer SDL is disposed on the insulating base layer IBL1. As an example of the invention, the step difference layer SDL may have adhesive properties. The step difference layer SDL may be disposed to be spaced apart from the adhesive layer AL. However, the embodiment of the invention is not limited thereto. The step difference layer SDL and the adhesive layer AL may be in the form of a single body.

The insulating base layer IBL1 may include a shape processing portion SPP (e.g., patterned portion) disposed to overlap the second region A2 of the display module DM. The shape processing portion SPP may have a concave-convex structure which defines the patterned portion. The shape processing portion SPP may be a solid portion of the insulating base layer IBL1, such as only a solid portion, but is not limited thereto or thereby. As an example of the invention, the shape processing portion SPP may include a plurality of convex portions CVP protruding in the third direction DR3 towards the second region A2, and a plurality of concave portions CCP recessed in the fourth direction DR4 opposite to the third direction DR3. The patterned portion may be defined in a distal end of the insulating base layer IBL1, which is furthest from the first region A1 along the second direction DR2.

Each of the plurality of convex portions CVP may extend in the first direction DR1 and may be arranged to be spaced apart in the second direction DR2. One concave portion CCP may be disposed between two adjacent convex portions among the plurality of convex portions CVP. Alternatively, each of the plurality of convex portions CVP may extend in the second direction DR2 and may be arranged to be spaced apart in the first direction DR1.

As an example of the invention, each of the convex portions CVP and the concave portions CCP has a hemispherical shape when viewed on a cross-section, but the shape of each of the convex portions CVP and the concave portions CCP is not particularly limited. Each of the convex portions CVP and the concave portions CCP may have a triangular shape or a rounded triangular shape.

The end of the window WM may extend further outside than the second region A2 of the display module DM. An end of the protection cover film PCF1 may extend further than the end of the window WM. The end of the protection cover film PCF1 may be disposed further outside than the end of the window WM. The end of the protection cover film PCF1 and the end of the window WM have a structure that extends further outside than the second region A2 of the display module DM, and protection performance for the second region A2 of the display module DM may be improved.

In addition, the shape processing portion SPP is provided in the protection cover film PCF1 to overlap the second region A2 of the display module DM, shocks applied to the second region A2 from the outside may thus be buffered through the shape processing portion SPP. Accordingly, the protection performance of the protection cover film PCF1 may be further improved through the shape processing portion SPP. Accordingly, the protection cover film PCF1 may reliably protect a bending portion (e.g., the second region A2 which is bent to define a bent portion) of the display module DM in a process of transporting the display device DDa for manufacturing the electronic device ED (see FIG. 1A).

Figure 9A:
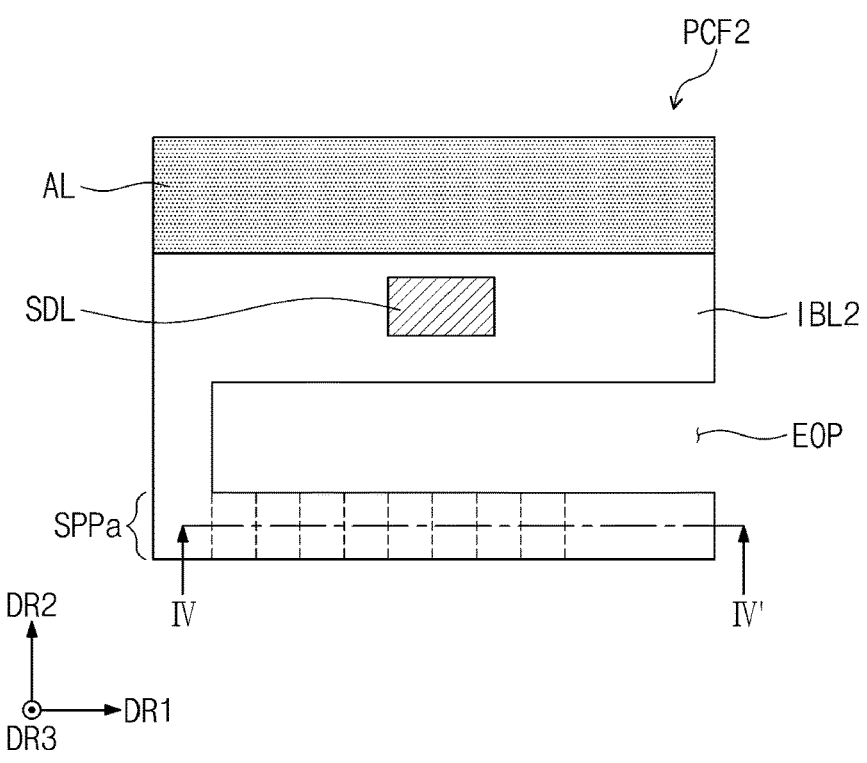
FIG. 9A is a plan view of a protection cover film according to an embodiment of the invention.
Figure 9B:
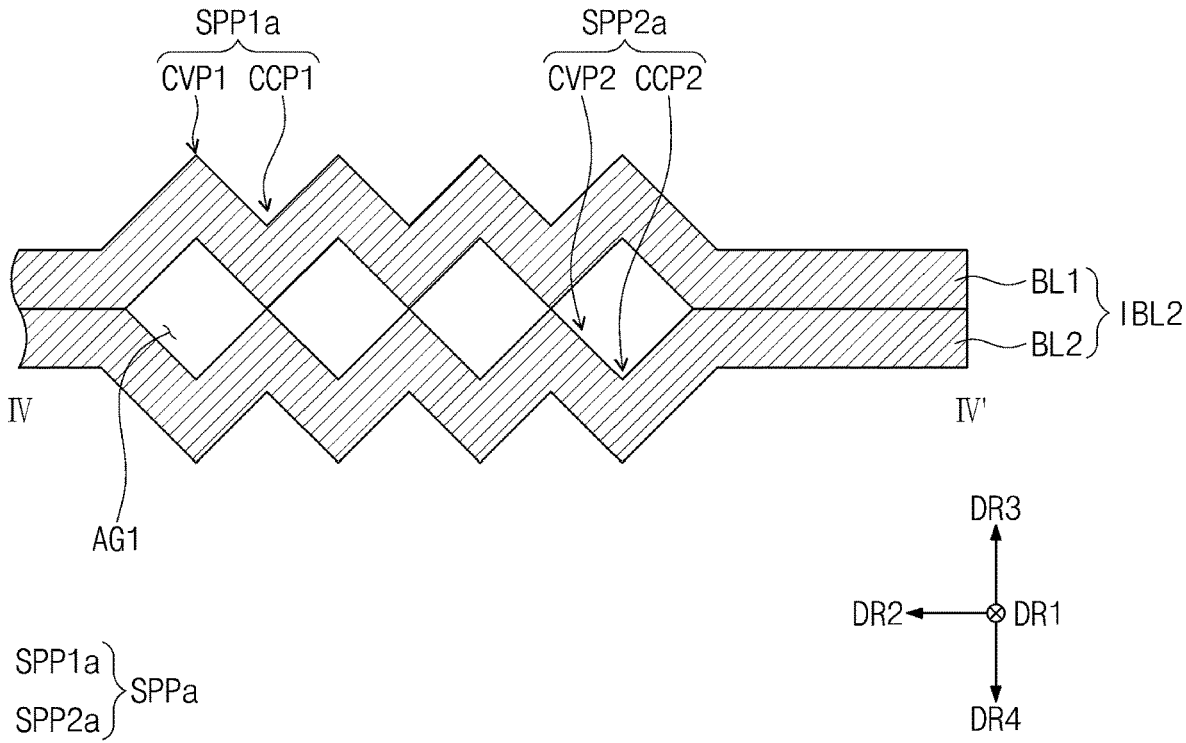
FIG. 9B is a cross-sectional view taken along line IV-IV' shown in FIG. 9A.

FIG. 9A is a plan view of a protection cover film PCF2 according to an embodiment of the invention, and FIG. 9B is a cross-sectional view taken along line IV-IV' shown in FIG. 9A.

Referring to FIGS. 9A and 9B, a protection cover film PCF2 includes an insulating base layer IBL2, an adhesive layer AL, and a step difference layer SDL.

The insulating base layer IBL2 may include an element open portion EOP and a shape processing portion SPPa. The element open portion EOP may expose the driving elements DEL (see FIG. 8A) mounted on the flexible circuit film FCB (see FIG. 8A) to the outside of the protection cover film PCF2. The element open portion EOP may be a recess in the insulating base layer IBL2 which is open along the second direction DR2, in the plan view. Accordingly, the driving elements DEL may not contact the upper surface of the insulating base layer IBL2. Accordingly, the element open portion EOP may prevent the driving elements DEL from being damaged by contact or friction with the protection cover film PCF2.

The insulating base layer IBL2 may include the shape processing portion SPPa (e.g., a first pattern portion) disposed to overlap the second region A2 of the display module DM. As an example of the invention, the insulating base layer IBL2 includes a first base layer BL1 and a second base layer BL2 disposed to face each other.

The shape processing portion SPPa includes a first shape processing portion SPP1a (e.g., a first patterned portion) provided in the first base layer BL1 and a second shape processing portion SPP2a (e.g., a second patterned portion) provided in the second base layer BL2. The first shape processing portion SPP1a includes a plurality of first convex portions CVP1 protruding in the third direction DR3, and a plurality of first concave portions CCP1 recessed in the fourth direction DR4. The second shape processing portion SPP2a includes a plurality of second convex portions CVP2 protruding in the fourth direction DR4, and a plurality of second concave portions CCP2 recessed in the third direction DR3.

Each of the plurality of first convex portions CVP1 may extend in the second direction DR2 and may be arranged to be spaced apart in the first direction DR1. One first concave portion CCP1 may be disposed between two first convex portions CVP1 among the plurality of first convex portions CVP1. Each of the plurality of second convex portions CVP2 may extend in the second direction DR2 and may be arranged to be spaced apart in the first direction DR1. One second concave portion CCP2 may be disposed between two second convex portions CVP2 among the plurality of second convex portions CVP2.

As an example of the invention, the first concave portions CCP1 are respectively disposed to correspond to the second convex portions CVP2, and the second concave portions CCP2 are disposed to correspond to the first convex portions CVP1. Accordingly, the first concave portions CCP1 and the second convex portions CVP2 may contact each other, and an air gap AG1 may be formed between the second concave portions CCP2 and the first convex portions CVP1. The air gap AG1 may be open along the second direction DR2, such as being open at opposing sides of the shape processing portion SPPa. The first base layer BL1 and the second base layer BL2 may contact each other at a remaining portion of the protection cover film PCF2, except for the shape processing portion SPPa. As being in contact, elements may form an interface therebetween, without being limited thereto.

As an example of the invention, each of the first convex portions CVP1 and the first concave portions CCP1 may have a triangular shape or a rounded triangular shape when viewed on a cross-section. The first convex portions CVP1 may have the same cross-sectional shape as the second convex portions CVP2. However, alternatively, the first convex portions CVP1 may have a cross-sectional shape different from that of the second convex portions CVP2.

The shape processing portion SPPa is provided in the protection cover film PCF2 to overlap the second region A2 of the display module DM, shocks applied to the second region A2 from the outside may thus be buffered through the shape processing portion SPPa. In particular, the shape processing portion SPPa further includes an air gap AG1 compared to the shape processing portion SPP shown in FIG. 8B. Accordingly, the protection cover film PCF2 may reliably protect a bending portion (e.g., the second region A2) of the display module DM in a process of transporting the display device DDa for manufacturing the electronic device ED (see FIG. 1A).

Figure 10A:
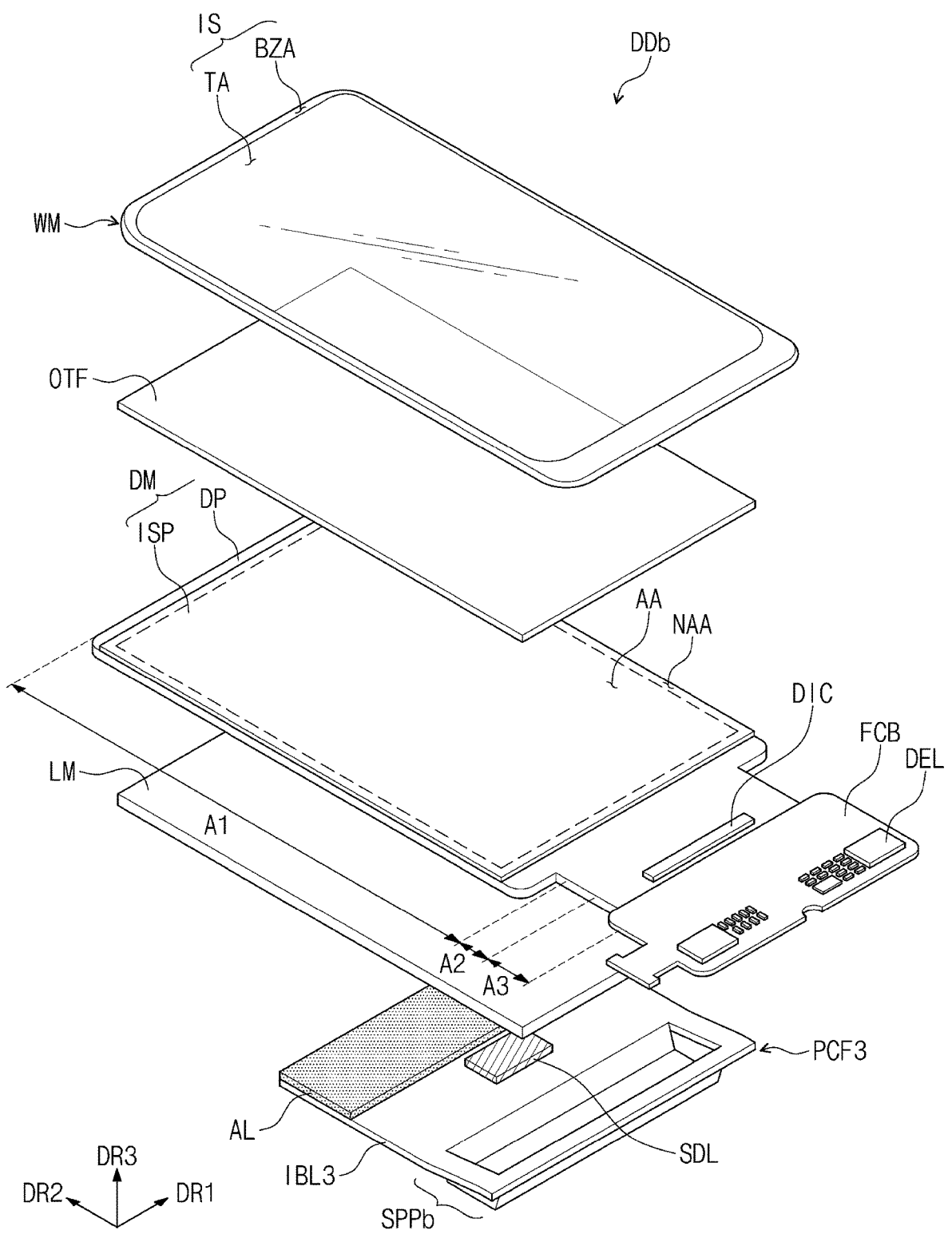
FIG. 10A is an exploded perspective view of a display device according to an embodiment of the invention.
Figure 10B:
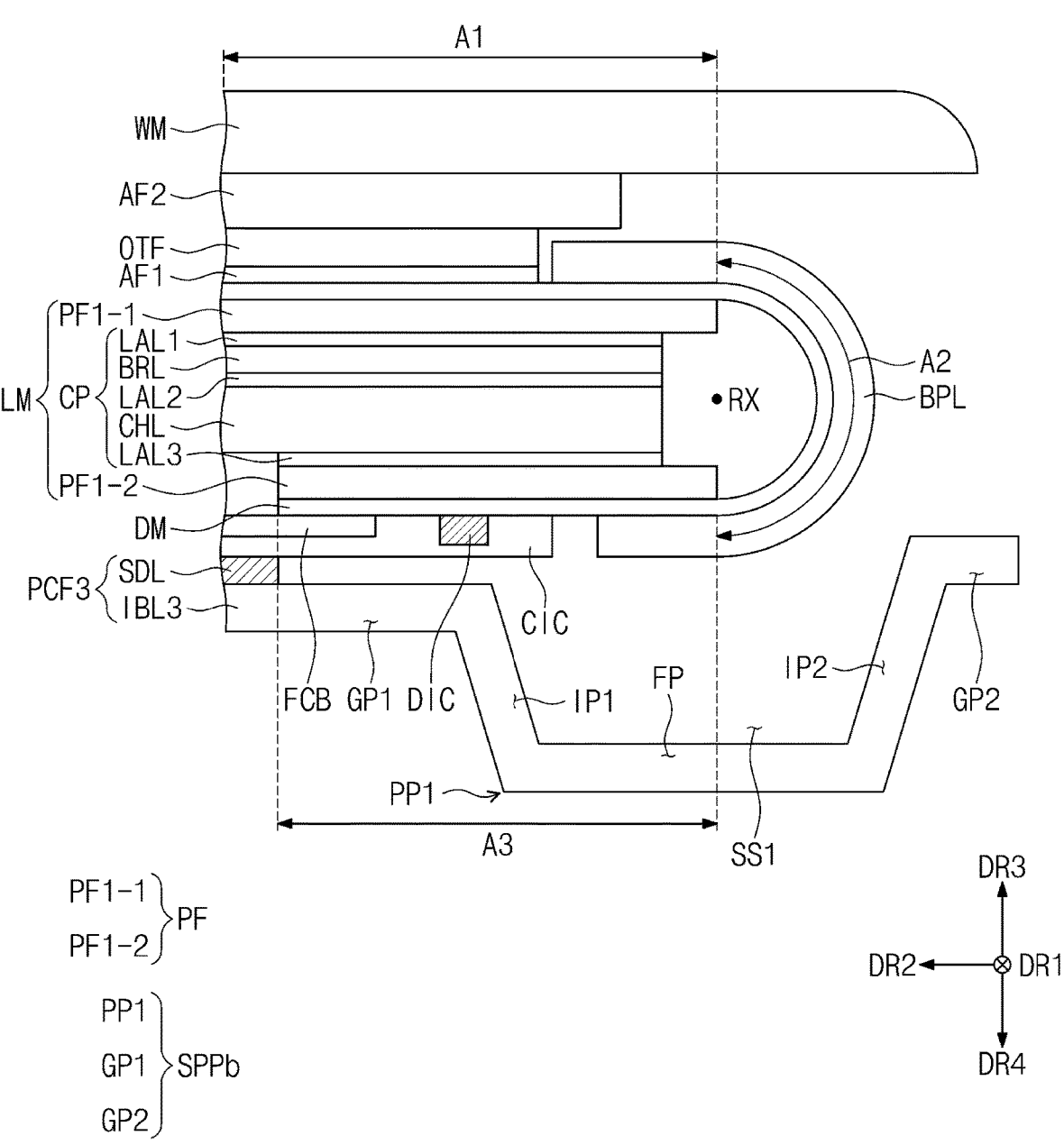
FIG. 10B is an enlarged cross-sectional view of a display device which is assembled, according to an embodiment of the invention.

FIG. 10A is an exploded perspective view of a display device DDb according to an embodiment of the invention, and FIG. 10B is an assembly cross-sectional view of a display device DDb (e.g., a display device DDb which is assembled) according to an embodiment of the invention. Among the components shown in FIGS. 10A and 10B, the same reference numerals are used for the same components as those shown in FIGS. 1B and 4B, and detailed descriptions thereof will be omitted.

Referring to FIGS. 10A and 10B, a display device DDb according to an embodiment of the invention may include a protection cover film PCF3.

The protection cover film PCF3 is disposed below the display module DM and the lower module LM. To be specific, the protection cover film PCF3 may be disposed below the rear surface of the lower module LM and the third region A3 of the display module DM to protect a bending region (e.g., the second region A2) of the display module DM and the flexible circuit film FCB.

The protection cover film PCF3 includes an insulating base layer IBL3, an adhesive layer AL, and a step difference layer SDL. The insulating base layer IBL3 may include or define a shape processing portion SPPb (e.g., a second pattern portion) disposed to overlap the second region A2 of the display module DM. The shape processing portion SPPb may include a protrusion portion PP1 protruding in the fourth direction DR4 opposite to the third direction DR3 towards the second region A2. Similar to the shape processing portion SPP of FIGS. 8A and 8B, the shape processing portion SPPb may include only a solid portion of the insulating base layer IBL3.

When viewed on a plane, the protrusion portion PP1 may have a rectangular shape extending in the first direction DR1. The protrusion portion PP1 may include a flat portion FP, a first side portion IP1 extending from one end of the flat portion FP, and a second side portion IP2 extending from the other end of the flat portion FP. The first side portion IP1 may have an inclined structure inclined with respect to the flat portion FP, and the second side portion IP2 may have an inclined structure inclined with respect to the flat portion FP. However, the shapes of the first and second side portions IP1 and IP2 are not limited thereto. The first and second side portions IP1 and IP2 may be perpendicular to the flat portion FP. The flat portion FP, together with the first side portion IP1 and the second side portion IP2, may define the protrusion portion PP1 as a recess which is open on the third direction DR3.

The shape processing portion SPPb may further include support portions GP1 and GP2 having a planar structure and each extended from the protrusion portion PP1, in opposite directions therefrom. As an example of the invention, the support portions GP1 and GP2 may include a first support portion GP1 overlapping the display module DM and a second support portion GP2 non-overlapping the display module DM. A step may be present between the first support portion GP1 and the second support portion GP2. That is, the first support portion GP1 and the second support portion GP2 may be non-coplanar with each other. The step between the first support portion GP1 and the second support portion GP2 may be caused due to a difference in length between the first and second side portions IP1 and IP2. The second side portion IP2 may be inclined longer in length than the first side portion IP1. Accordingly, the second support portion GP2 may be closer to the window WM than the first support portion GP1, along the thickness direction. In addition, as an example of the invention, an end of the second support portion GP2 may be disposed further outside than the end of the window WM.

A sufficient buffer space SS1 (or a separation space) may be secured between the second region A2 of the display module DM at the end portion of the display device DDb which is bent, and the protection cover film PCF3, through the shape processing portion SPPb. Shocks applied to the second region A2 from the outside may be buffered through the buffer space SS1 and the shape processing portion SPPb. Accordingly, protection performance of the protection cover film PCF3 may be further improved. Accordingly, the protection cover film PCF3 may reliably protect a bending portion (e.g., the second region A2) of the display module DM in a process of transporting the display device DDb for manufacturing the electronic device ED (see FIG. 1A).

Figure 11A:
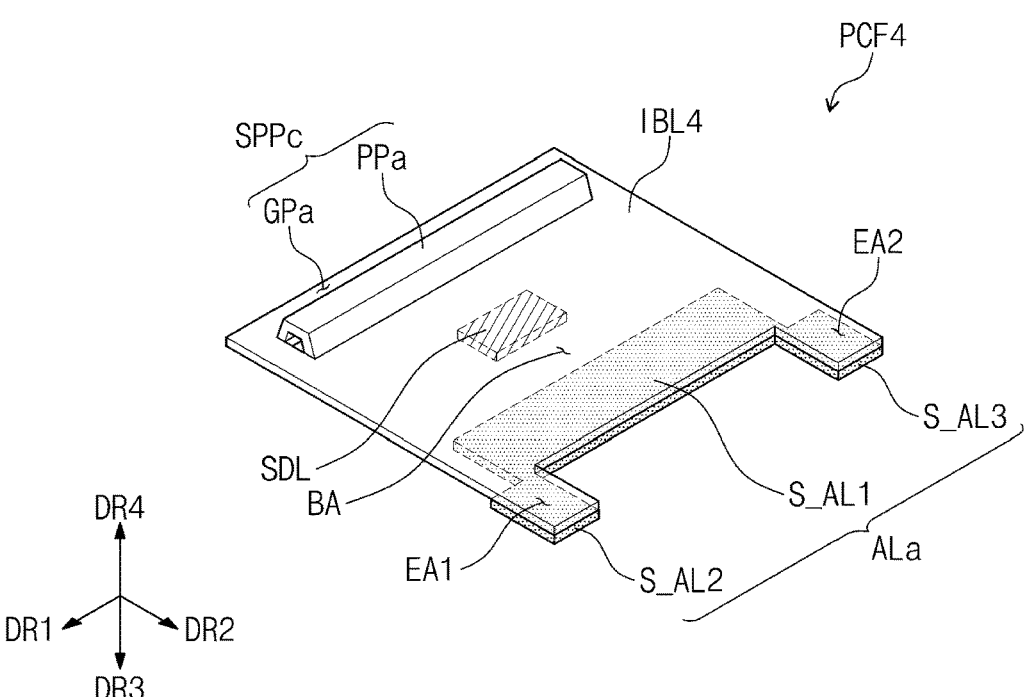
FIGS. 11A and 11B are perspective views of a protection cover film according to embodiments of the invention.
Figure 11B:
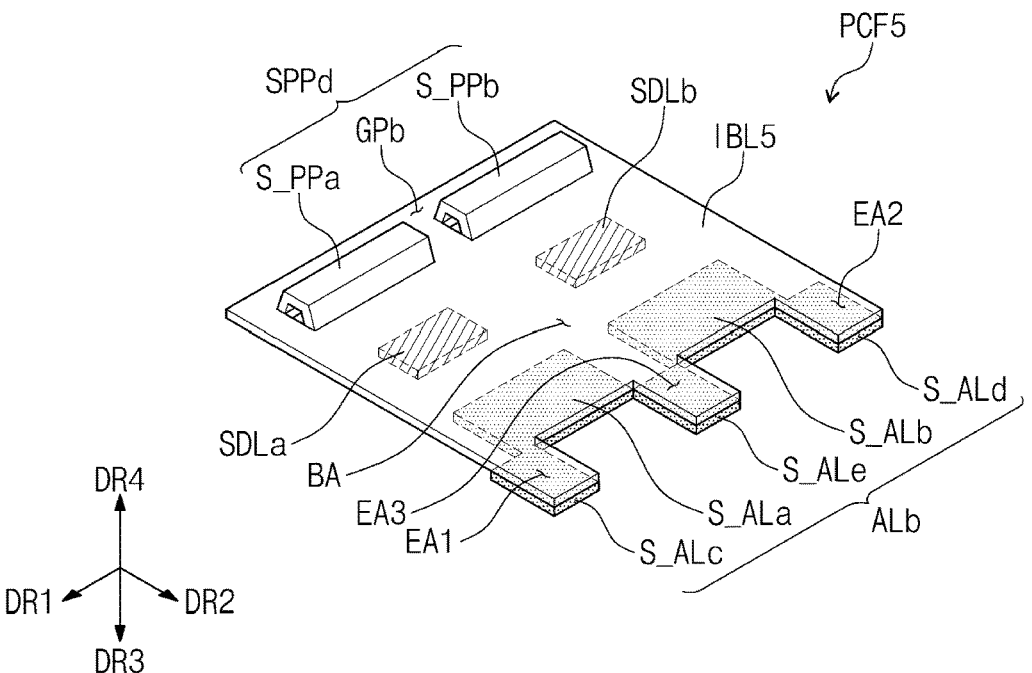

FIGS. 11A and 11B are perspective views of a protection cover film PCF according to embodiments of the invention. FIGS. 11A and 11B are rear views of the protection cover film PCF.

Referring to FIGS. 10A and 11A, a protection cover film PCF4 according to an embodiment of the invention includes an insulating base layer IBL4, an adhesive layer ALa, and a step difference layer SDL. The insulating base layer IBL4 may include a shape processing portion SPPc disposed to overlap the second region A2 of the display module DM. The shape processing portion SPPc may include a protrusion portion PPa protruding in the fourth direction DR4 opposite to the third direction DR3 towards the second region A2. The shape processing portion SPPc may further include a support portion GPa disposed to extend from all sides of the protrusion portion PPa to surround the protrusion portion PPa. As the support portion GPa is disposed around the protrusion portion PPa, shocks applied to the protrusion portion PPa is offset through the support portion GPa, and the shape of the protection cover film PCF4 may thus be prevented from being deformed.

The insulating base layer IBL4 may include a body region BA and first and second extension regions EA1 and EA2 extending from the body region BA in the second direction. The adhesive layer ALa may include a first sub adhesive layer S_AL1 disposed in the body region BA, and second and third sub adhesive layers S_AL2 and S_AL3 respectively disposed in the first and second extension regions EA1 and EA2 of the insulating base layer IBL4. The structure in which the first to third sub adhesive layers S_AL1, S_AL2, and S_AL3 are separated is shown, but the embodiment of the invention is not limited thereto. For example, the first sub adhesive layer S_AL1 may be in the form of a single body with the second sub adhesive layer S_AL2, and the first sub adhesive layer S_AL1 may be in the form of a single body with the third sub adhesive layer S_AL3.

Shocks applied to the protrusion portion PPa may be offset through the adhesive layer ALa, and accordingly, the shape of the protection cover film PCF4 may be prevented from being deformed.

Referring to FIGS. 10A and 11B, a protection cover film PCF5 according to an embodiment of the invention includes an insulating base layer IBL5, an adhesive layer ALb, and first and second step difference layers SDLa and SDLb. The first and second step difference layers SDLa and SDLb may be disposed to be spaced apart from each other in the first direction DR1. The first and second step difference layers SDLa and SDLb are provided at positions that non-overlap the driving elements DEL (see FIG. 8A) disposed on the flexible circuit film FCB (see FIG. 8A). The shape and number of the first and second step difference layers SDLa and SDLb are not particularly limited.

The insulating base layer IBL5 may include a shape processing portion SPPd disposed to overlap the second region A2 of the display module DM. The shape processing portion SPPd may include first and second protrusion portions S_PPa and S_PPb protruding in the fourth direction DR4. The first and second protrusion portions S_PPa and S_PPb may be disposed to be spaced apart from each other in the first direction DR1.

The shape processing portion SPPd may further include a support portion GPb disposed to surround the first and second protrusion portions S_PPa and S_PPb. As the support portion GPb is disposed around the first and second protrusion portions S_PPa and S_PPb, shocks applied to the first and second protrusion portions S_PPa and S_PPb are offset through the support portion GPb, and the shape of the protection cover film PCF5 may be prevented from being deformed.

The insulating base layer IBL5 may include a body region BA, and first to third extension regions EA1, EA2, EA3 extending from the body region BA in the second direction. The adhesive layer ALb includes first and second sub adhesive layers S_ALa and S_ALb disposed in the body region BA. The adhesive layer ALb may include third to fifth sub adhesive layers S_ALc, S_ALd, and S_ALe respectively disposed in the first to third extension regions EA1, EA2, and EA3. The structure in which the first to fifth sub adhesive layers S_ALa to S_ALe are separated is shown, but the embodiment of the invention is not limited thereto. For example, the first sub adhesive layer S_ALa may be in the form of a single body with the third and fourth sub adhesive layers S_ALc and S_ALd, and the second sub adhesive layer S_ALb may be in the form of a single body with the fourth and fifth sub adhesive layer S_ALd and S_ALe.

Shocks applied to the first and second protrusion portions S_PPa and S_PPb may be offset through the adhesive layer ALb, and accordingly, the shape of the protection cover film PCF5 may be prevented from being deformed.

Figure 12A:
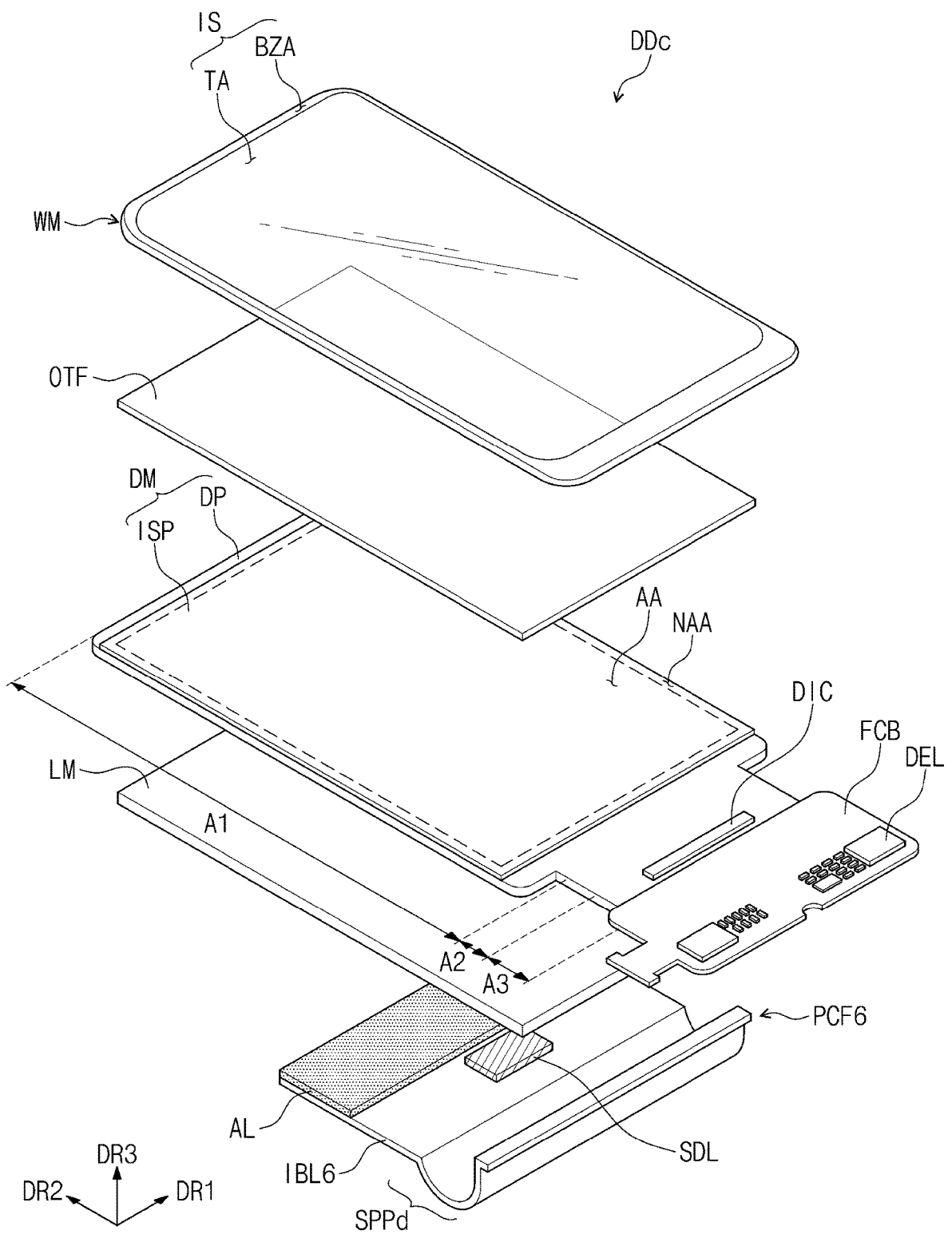
FIG. 12A is an exploded perspective view of a display device according to an embodiment of the invention.
Figure 12B:
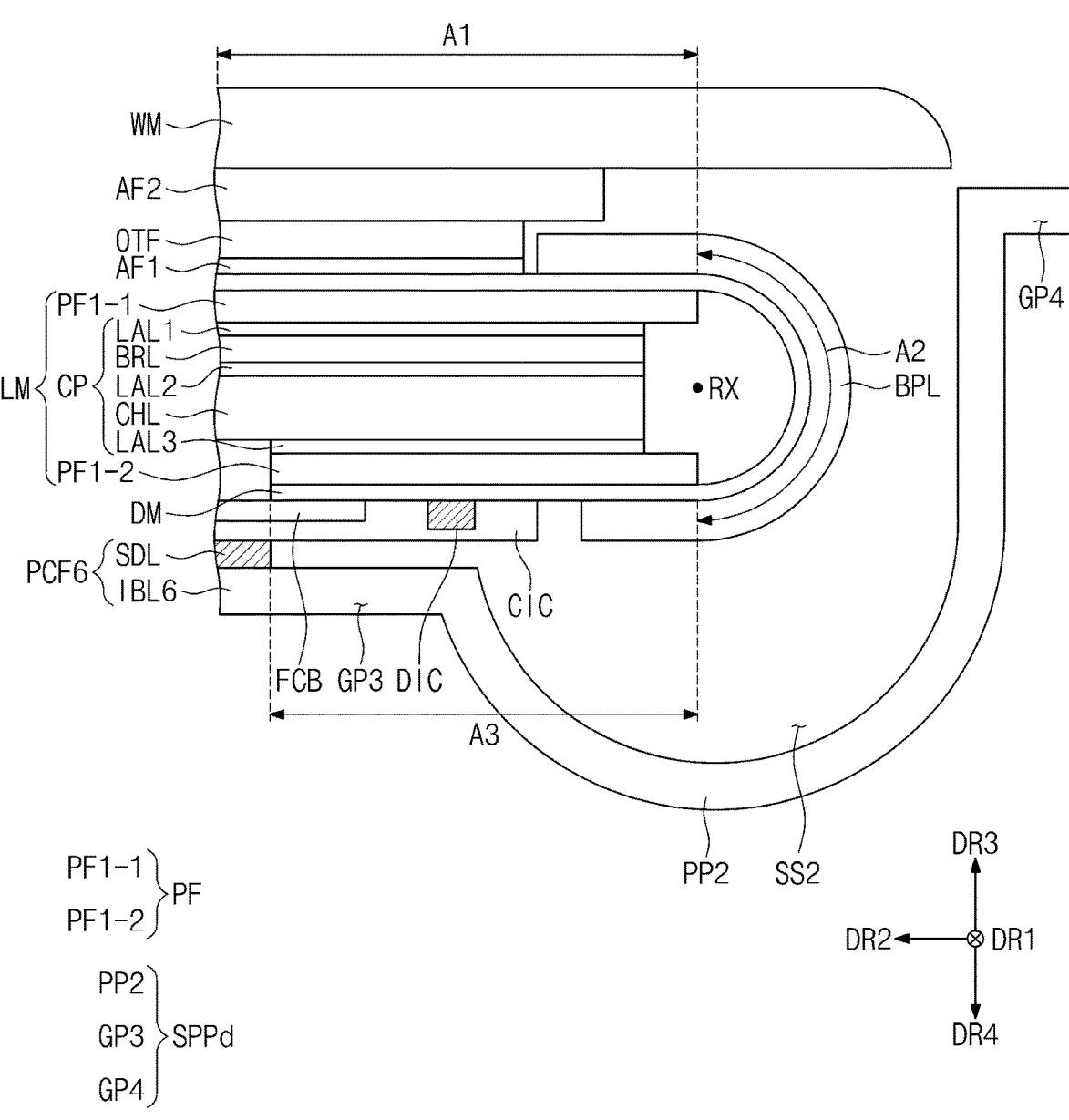
FIG. 12B is an enlarged cross-sectional view of a display device which is assembled, according to an embodiment of the invention.

FIG. 12A is an exploded perspective view of a display device DDc according to an embodiment of the invention, and FIG. 12B is an assembly cross-sectional view of a display device DDc according to an embodiment of the invention. Among the components shown in FIGS. 12A and 12B, the same reference numerals are used for the same components as those shown in FIGS. 10A and 10B, and detailed descriptions thereof will be omitted.

Referring to FIGS. 12A and 12B, a display device DDc according to an embodiment of the invention may include a protection cover film PCF6.

The protection cover film PCF6 is disposed below the display module DM and the lower module LM. To be specific, the protection cover film PCF6 may be disposed below the rear surface of the lower module LM and the third region A3 of the display module DM to protect a bending region (e.g., the second region A2) of the display module DM and the flexible circuit film FCB.

The protection cover film PCF6 includes an insulating base layer IBL6, an adhesive layer AL, and a step difference layer SDL. The insulating base layer IBL6 may include a shape processing portion SPPd disposed to overlap the second region A2 of the display module DM. The shape processing portion SPPd may include a protrusion portion PP2 protruding in the fourth direction DR4 opposite to the third direction DR3 towards the second region A2. When viewed on a plane, the protrusion portion PP2 may have a shape extending in the first direction DR1. The protrusion portion PP2 may have a rounded cross-sectional shape. The protrusion portion PP2 may be an open groove which is open in the third direction DR3, and open in the first direction DR1 at a first end and a second end which is opposite to the first end of the shape processing portion SPPd.

The shape processing portion SPPd may further include support portions GP3 and GP4 having a planar structure parallel to the window WM. The support portions GP3 and GP4 may extend from a first side and a second side opposite to the first side, of the protrusion portion PP2, along the second direction DR2. As an example of the invention, the support portions GP3 and GP4 may include a first support portion GP3 overlapping the display module DM and a second support portion GP4 non-overlapping the display module DM. A step may be present between the first support portion GP3 and the second support portion GP4. The second support portion GP4 may be closer to the window WM than the first support portion GP3. In addition, as an example of the invention, an end of the second support portion GP4 may be disposed further outside than the end of the window WM.

As an example of the invention, the protrusion portion PP2 may be disposed to surround the second region A2 of the display module DM which is exposed at the end portion of the display module DM which is bent. A sufficient buffer space SS2 (or a separation space) may be secured between the second region A2 of the display module DM and the protection cover film PCF6. Accordingly, when shocks are applied to the second region A2 from the outside, the buffer space SS2 and the shape processing portion SPPd may buffer the shocks. Accordingly, protection performance of the protection cover film PCF6 may be further improved. Thus, the protection cover film PCF6 may reliably protect a bending portion (e.g., the second region A2) of the display module DM in a process of transporting the display device DDc for manufacturing the electronic device ED (see FIG. 1A).

Figure 13:
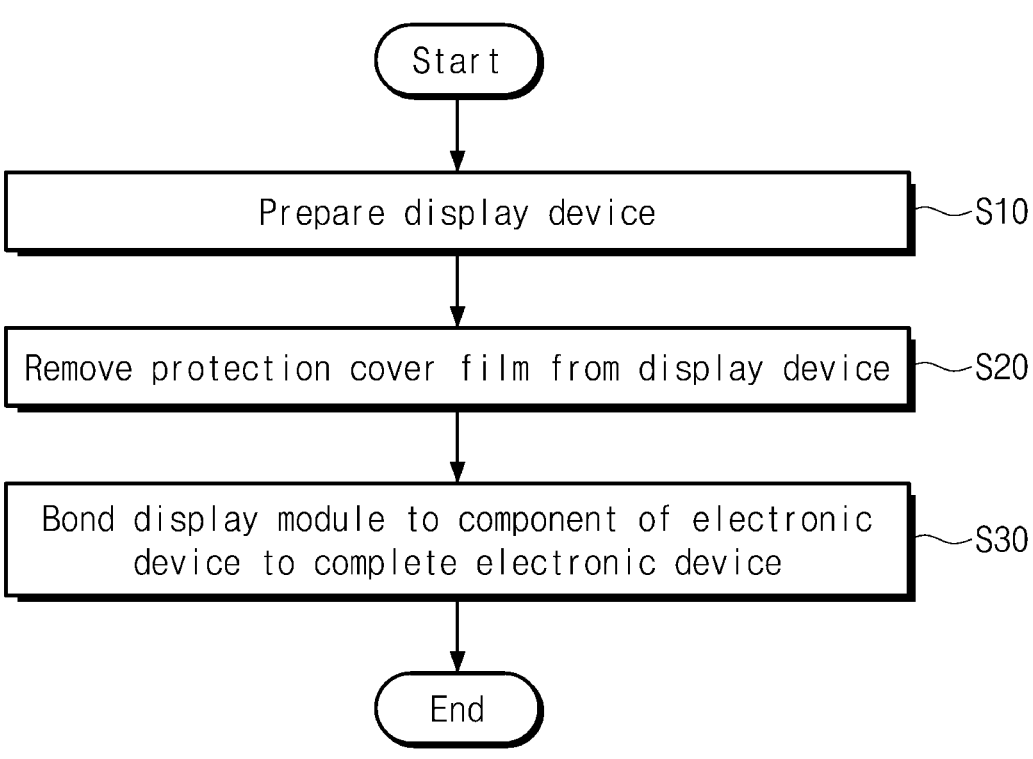
FIG. 13 is a flowchart showing a method of manufacturing (or providing) an electronic device according to an embodiment of the invention.

FIG. 13 is a flowchart showing a method of manufacturing (or providing) an electronic device ED according to an embodiment of the invention. Reference numerals refer to FIGS. 1A to 12B.

First, display devices DD, DDa, DDb, and DDc are provided (S10). The display device DD, DDa, DDb, and DDc may be the display devices DD, DDa, DDb, and DDc described with reference to FIGS. 1A to 12. The display devices DD, DDa, DDb, and DDc which are provided include a window WM, a display module DM which is bent, and protection cover films PCF, PCFa to PCFf, and PCF1 to PCF6 which are attached to the display module DM which is bent. Accordingly, the process of providing the display devices DD, DDa, DDb, and DDc may include attaching the protection cover films PCF, PCFa to PCFf, and PCF1 to PCF6 to a rear surface of the display module DM which is bent.

While the display devices DD, DDa, DDb, and DDc are being transported, the display module DM which is bent to expose the second region A2 at the end portion of the display module DM, is protected through the protection cover film PCF, PCFa to PCFf, and PCF1 to PCF6, and the display module DM which is bent may thus be provided without defects. The provided display devices DD, DDa, DDb, and DDc having the various display modules and protection cover films attached thereto, may define an intermediate structure of a respective electronic device, without being limited thereto.

The protection cover films PCF, PCFa to PCFf, and PCF1 to PCF6 are removed from the display devices DD, DDa, DDb, and DDc (S20). In an embodiment, after transport, after subsequent processing, etc., a respective cover film may be removed from a respective display device to expose the end portion of a respective bent display module to outside the intermediate structure. That is, the protection cover film films PCF, PCFa to PCFf, and PCF1 to PCF6 are removably attached to the display devices DD, DDa, DDb, and DDc. The adhesive layer AL of the protection cover film films PCF, PCFa to PCFf, and PCF1 to PCF6 may removably attach the protection cover film films PCF, PCFa to PCFf, and PCF1 to PCF6 to the display devices DD, DDa, DDb, and DDc.

Thereafter, the display module DM which is bent to define the bent end portion thereof, is bonded to components of an electronic device ED (S30), to provide a completed or final electronic device. The components of the electronic device ED may include the outer case EDC (see FIG. 1B) physically bonded to the display module DM.

When physically bonding the components of the electronic device ED and the display module DM, an adhesive member and additional structures may be used.

According to one or more embodiment of the invention, a display device DD includes a protection cover film PCF for protecting a display module DM which is bent to define an exposed end portion thereof, and may thus reliably protect the display module DM which is bent, when an electronic device ED is manufactured. The protection cover film PCF provides an impact-absorbing member such as an air gap AG or a shape processing portion SPP for buffering shocks provided to a bent region of the display module DM, and may thus improve protection performance thereof. The air gap AG may be an enclosed space, may be open to outside the protection cover film, etc. without being limited thereto.

Although the present disclosure has been described with reference to a embodiment of the invention, it will be understood that the invention should not be limited to these preferred embodiments but various changes and modifications can be made by those skilled in the art without departing from the spirit and scope of the present disclosure. Accordingly, the technical scope of the invention is not intended to be limited to the contents set forth in the detailed description of the specification, but is intended to be defined by the appended claims.

What is claimed is:

1. A display device comprising:
a display module including a bending region at which the display module is bent; and
a protection cover film which is disposed below the bending region of the display module to protect the display module;
wherein the protection cover film includes:
an insulating base layer which faces the display module which is bent; and
an adhesive layer which is between the insulating base layer and the display module, wherein the insulating base layer defines an air gap within the insulating base layer, the air gap faces the bending region of the display module which is bent, and
wherein an end of the protection cover film is disposed further outside than the bending region of the display module.

2. The display device of claim 1, wherein
the display module is bent with respect to a bending axis, and
the insulating base layer defines the air gap extending parallel to the bending axis.

3. The display device of claim 2, wherein the insulating base layer defines:
the air gap provided in plural comprising a plurality of sub air gaps, and
the plurality of sub air gaps arranged in a direction crossing the bending axis.

4. The display device of claim 1, wherein
the display module is bent with respect to a bending axis, and
the insulating base layer defines:
the air gap provided in plural comprising a plurality of sub air gaps, and
the plurality of sub air gaps arranged in a direction parallel to the bending axis and a direction crossing the bending axis.

5. The display device of claim 1, wherein the air gap has a planar shape including a polygonal shape, a circular shape or an elliptical shape.

6. The display device of claim 1, wherein the insulating base layer of the protection cover film comprises:
a first base layer;
a second base layer facing the first base layer; and
the air gap defined as an air layer between the first base layer and the second base layer which face each other.

7. The display device of claim 1, wherein the insulating base layer of the protection cover film comprises:
a first base layer, a second base layer, a third base layer and a fourth base layer in order from the bending region of the display module which bent; and
the air gap provided in plural comprising:
a first sub air gap defined between the first base layer and the second base layer, and
a second sub air gap defined between the third base layer and the fourth base layer.

8. The display device of claim 1, wherein
the protection cover film further comprises a step difference layer which is between the insulating base layer and the display module, and
the step difference layer maintains a gap between the insulating base layer and the display module, the gap disposed at the bending region.

9. The display device of claim 8, wherein the step difference layer has adhesive properties.

10. The display device of claim 8, further comprising:
a flexible circuit film connected to the display module; and
a driving element on the flexible circuit film,
wherein the step difference layer non-overlaps the driving element.

* * * * *